(12) United States Patent
Rodriguez

(10) Patent No.: US 12,695,590 B2
(45) Date of Patent: *Jul. 28, 2026

(54) METHODS AND SYSTEMS FOR ENHANCING DETECTION OF FRAUDULENT AUTHENTICATION DATA

(71) Applicant: Daon Technology, Douglas (IM)

(72) Inventor: Raphael A. Rodriguez, Marco Island, FL (US)

(73) Assignee: Daon Technology, Douglas (IM)

( * ) Notice: Subject to any disclaimer, the term of this patent is extended or adjusted under 35 U.S.C. 154(b) by 0 days.

This patent is subject to a terminal disclaimer.

(21) Appl. No.: 19/282,298

(22) Filed: Jul. 28, 2025

(65) Prior Publication Data

US 2026/0213916 A1     Jul. 23, 2026

Related U.S. Application Data

(63) Continuation-in-part of application No. 19/034,984, filed on Jan. 23, 2025, now Pat. No. 12,413,402.

(51) Int. Cl.
H04L 9/00        (2022.01)
G06N 10/40        (2022.01)
(Continued)

(52) U.S. Cl.
CPC ............. H04L 9/002 (2013.01); G06N 10/40 (2022.01); G06N 10/60 (2022.01); H04L 9/0869 (2013.01);
(Continued)

(58) Field of Classification Search
CPC ..... H04L 9/00; H04L 9/08; H04L 9/32; H04L 9/002; H04L 9/0869; H04L 9/3231; H04L 2209/34; G06N 10/40; G06N 10/60
See application file for complete search history.

(56) References Cited

U.S. PATENT DOCUMENTS 12,190,564 B2    1/2025  Ji et al.
12,204,994 B2    1/2025  Lienhard et al.
(Continued)

FOREIGN PATENT DOCUMENTS

DE        102024115481 A1    12/2025
WO      WO 2024/226570        10/2024
(Continued)

OTHER PUBLICATIONS

J. Preskill, "Quantum computing in the NISQ era and beyond," Quantum, vol. 2, p. 79, Aug. 2023.
(Continued)

*Primary Examiner* — Jayesh M Jhaveri
(74) *Attorney, Agent, or Firm* — Kevin McDermott, Esq.

(57) ABSTRACT

A method for enhancing detection of fraudulent authentication data includes receiving, by an electronic device, data during an authentication transaction, computing a feature vector from the received data, and normalizing the feature vector. The method also includes encoding the normalized feature vector into qubits, expanding, using at least one quantum algorithm, the normalized feature vector into a high-dimensional space, and detecting in the high-dimensional space anomalies indicative of fraud based on the qubits. Furthermore, the method includes calculating, based on the detected anomalies, a confidence score reflecting a likelihood that the received data is genuine and comparing the confidence score against a threshold value. In response to determining the confidence score fails to satisfy the threshold value, the method determines that the received data requires secondary authentication.

20 Claims, 6 Drawing Sheets

AMPLITUDE
ENCODING

(51) Int. Cl.
| | |
|---|---|
| *G06N 10/60* | (2022.01) |
| *H04L 9/08* | (2006.01) |
| *H04L 9/32* | (2006.01) |

(52) U.S. Cl.
CPC ........ *H04L 9/3231* (2013.01); *H04L 2209/34*
(2013.01)

(56) References Cited

U.S. PATENT DOCUMENTS

| | | | | |
|---|---|---|---|---|
| 2012/0219176 | A1 | 8/2012 | Guan et al. | |
| 2019/0052460 | A1 | 2/2019 | Fu | |
| 2020/0175290 | A1 | 6/2020 | Raja et al. | |
| 2020/0218885 | A1 | 7/2020 | Budhrani et al. | |
| 2021/0117529 | A1 | 4/2021 | Martinez et al. | |
| 2021/0203493 | A1 | 7/2021 | Chen | |
| 2022/0121884 | A1 | 4/2022 | Zadeh et al. | |
| 2022/0405362 | A1 | 12/2022 | Yanamala et al. | |
| 2023/0126764 | A1* | 4/2023 | Ibrahim | G06N 10/20 |
| | | | | 705/44 |
| 2023/0206104 | A1 | 6/2023 | Rab et al. | |
| 2023/0206605 | A1 | 6/2023 | Aoki | |
| 2023/0308198 | A1 | 9/2023 | Sakai | |
| 2024/0119576 | A1 | 4/2024 | Qui et al. | |
| 2024/0127395 | A1 | 4/2024 | Nakatsugawa | |
| 2024/0177519 | A1 | 5/2024 | Sinah et al. | |
| 2024/0311670 | A1 | 9/2024 | Senokosov et al. | |
| 2024/0406170 | A1 | 12/2024 | Harris et al. | |

| | | | | |
|---|---|---|---|---|
| 2025/0014388 | A1 | 1/2025 | Venkataraman et al. | |
| 2025/0030540 | A1 | 1/2025 | Nix | |
| 2025/0259082 | A1* | 8/2025 | Crabtree | G06N 3/042 |
| 2026/0106877 | A1* | 4/2026 | Palanki | H04L 63/1416 |

FOREIGN PATENT DOCUMENTS

| | | | | |
|---|---|---|---|---|
| WO | WO-2024226570 A1 * | 10/2024 | | G06N 3/045 |
| WO | WO 2025/002636 | 1/2025 | | |

OTHER PUBLICATIONS

P. J. Phillips, et al., "The FERET database and evaluation procedure for face recognition algorithms," Image Vis. Comput., vol. 16, No. 5, pp. 295-306, Apr. 1998.

R. Raghavendra, et al., "Detecting morphed face images," IEEE Trans. Inf. Forensics Security, vol. 12, No. 7, pp. 1673-1686, Jul. 2017.

U. Scherhag et al., "Detection of face morphing attacks based on PRNU patterns," J. Electron. Imaging, vol. 28, No. 2, p. 023007, Mar. 2019.

Chaudary et al. "Differential Morph Face Detection Using Discriminitive Wavelet Sub-Bands", Proceedings on the IEEE/CVF CVPR, 2021,pp. 1425-1434 (year: 2021).

Venkatesh et al. "Face Morphing Attack Generation and Detection: A Comprehensive Survey", IEEE Transitions on Technology and Society, vol. 2, No. 3, Sep. 2021.

\* cited by examiner

AMPLITUDE
ENCODING

FEATURE
VECTOR X =
$(X_1, X_2,...X_i)$ — S1

NORMALIZATION — S2

$|0\rangle$
$|1\rangle$
...
$|i-1\rangle$ — S3

ANGLE
ENCODING

FEATURE
VECTOR X =
$(X_1, X_2,...X_i)$ — S4

NORMALIZATION — S5

QUBIT — S6

APPLY ROTATIONS
$(R_Y(\Theta_i))$ TO QUBITS — S7

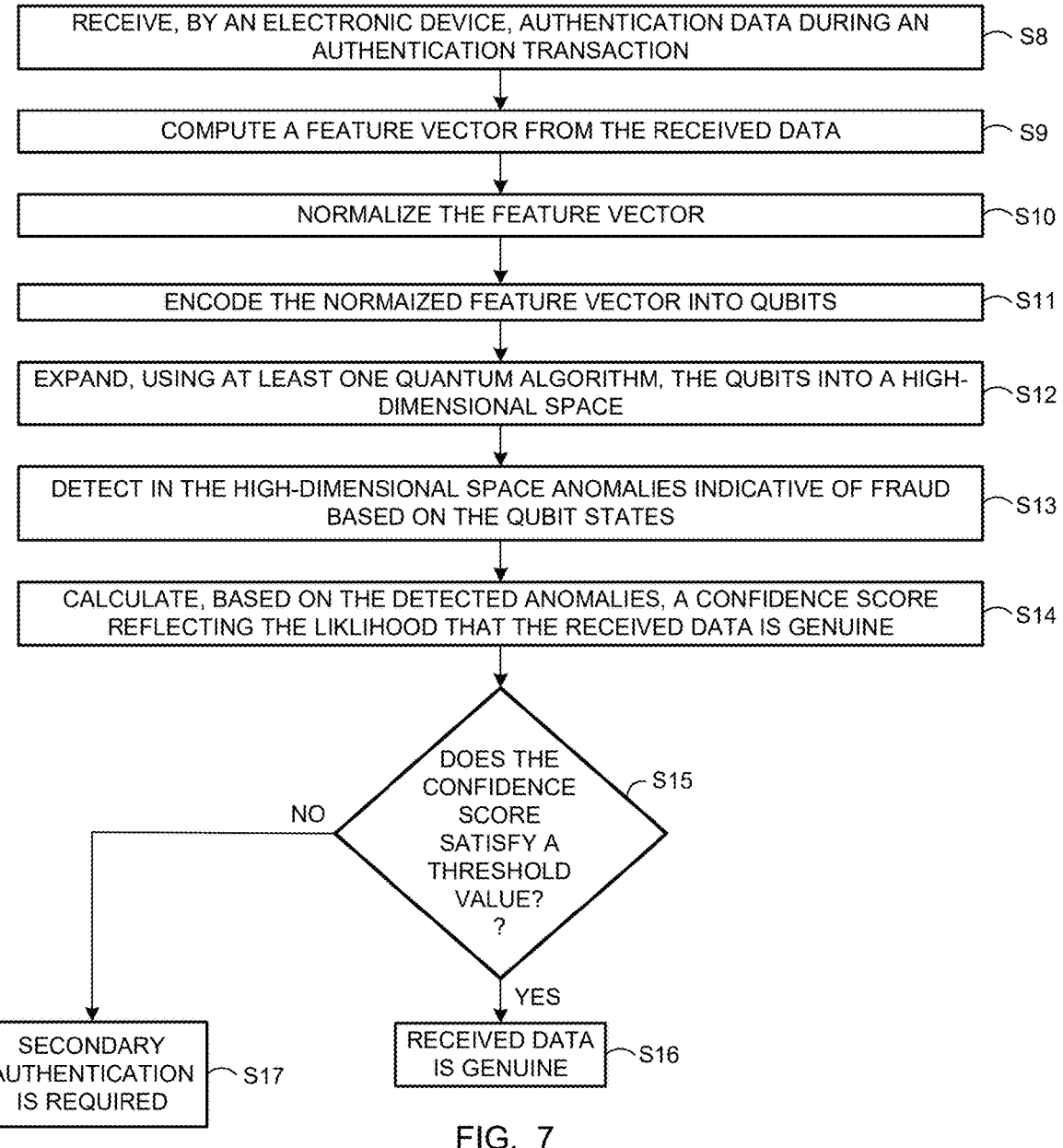

RECEIVE, BY AN ELECTRONIC DEVICE, AUTHENTICATION DATA DURING AN AUTHENTICATION TRANSACTION — S8

COMPUTE A FEATURE VECTOR FROM THE RECEIVED DATA — S9

NORMALIZE THE FEATURE VECTOR — S10

ENCODE THE NORMAIZED FEATURE VECTOR INTO QUBITS — S11

EXPAND, USING AT LEAST ONE QUANTUM ALGORITHM, THE QUBITS INTO A HIGH-DIMENSIONAL SPACE — S12

DETECT IN THE HIGH-DIMENSIONAL SPACE ANOMALIES INDICATIVE OF FRAUD BASED ON THE QUBIT STATES — S13

CALCULATE, BASED ON THE DETECTED ANOMALIES, A CONFIDENCE SCORE REFLECTING THE LIKLIHOOD THAT THE RECEIVED DATA IS GENUINE — S14

DOES THE CONFIDENCE SCORE SATISFY A THRESHOLD VALUE? ? — S15

NO

YES

SECONDARY AUTHENTICATION IS REQUIRED — S17

RECEIVED DATA IS GENUINE — S16

FIG. 7

ATTACKER:  $|\psi\rangle = (1, 011011)$ —— 56

GENUINE:  $\sqrt{\alpha}\ (1, 011011)$ —— 58

FIG. 8

METHODS AND SYSTEMS FOR ENHANCING DETECTION OF FRAUDULENT AUTHENTICATION DATA

CROSS-REFERENCE TO RELATED APPLICATIONS

This is a continuation-in-part application of U.S. patent application Ser. No. 19/034,984, filed Jan. 23, 2025, the entire disclosure of which is incorporated herein by reference.

BACKGROUND OF THE INVENTION

This invention relates generally to authentication data, and more particularly, to methods and systems for enhancing detection of fraudulent authentication data.

Known identity proofing and fraud detection techniques rely heavily on rule-based engines, neural networks, and statistical algorithms, to verify the authenticity of biometric or document data. However, the emergence of generative technologies like deep fake tools and synthetic data generators have exposed vulnerabilities in these techniques.

These techniques have been known to miss cases of synthetic or tampered identities characterized by subtle, generative adversarial network-based anomalies or morphing attempts. Additionally, these techniques have been known to fail to capture nuanced patterns in high-dimensional biometric data, resulting in both false negatives and an inability to pinpoint sophisticated deepfake artifacts. Additionally, attackers have been increasingly using fraudulent multi-modal authentication data, for example, image data, audio data, and document image data, to increase the difficulty of detection using known techniques. Moreover, environmental noise, legitimate user variations, and constrained feature sets can cause known techniques to generate inaccurate results which undermine users' experiences and confidence.

Additionally, it appears that known quantum-enhanced biometric authentication techniques may be a promising countermeasure against sophisticated identity fraud attacks perpetuated, for example, via morphing, deepfake replay, synthetic voice injections, and face injections.

Known quantum enhanced computer systems that implement such quantum techniques are believed to be secure against identity fraud attacks so are not designed to counter more sophisticated types of security threats. As a result, such quantum enhanced computer systems may be vulnerable to attacks perpetuated by adversaries capable of intercepting, cloning or replaying quantum state vectors. These vectors may be derived from static biometric features such as face embeddings or voiceprints. It is possible that these vectors can be used to exploit known quantum enhanced computer systems through side-channel attacks, replay attempts, or pattern memorization attacks. A side-channel attack is an attack that leverages inadvertently leaked information such as timing, power consumption, or electromagnetic or acoustic emissions to compromise a system and information in the system. As a result, the trustworthiness and accuracy of authentication transaction results would decrease and costs associated with fighting against such attacks would increase.

Thus, it would be advantageous and an improvement over the relevant technology to provide a method, an electronic device, and a computer-readable recording medium capable of detecting subtle, generative adversarial network-based anomalies or morphing attempts and nuanced patterns in high-dimensional biometric data, and capable of enhancing security against quantum side-channel replay attacks during authentication transactions.

BRIEF DESCRIPTION OF THE INVENTION

In one aspect of the present disclosure, a method for enhancing detection of fraudulent authentication data including receiving, by an electronic device, data during an authentication transaction, computing a feature vector from the received data, normalizing the feature vector, and encoding the normalized feature vector into qubits. Moreover, the method includes expanding, using at least one quantum algorithm, the qubits into a high-dimensional space, detecting in the high-dimensional space anomalies indicative of fraud based on the qubits, and calculating, based on the detected anomalies, a confidence score reflecting a likelihood that the received data is genuine. The confidence score is compared against a threshold value. In response to determining the confidence score fails to satisfy the threshold value, the method determines that the received data requires secondary authentication.

In one embodiment of the present disclosure, the encoding step includes encoding the normalized feature vector using at least one of amplitude encoding and angle encoding.

In another embodiment of the present disclosure, the received data includes at least one of biometric modality data, identity document image data, and document image data.

In yet another embodiment of the present disclosure, the expanding step includes applying the at least one quantum algorithm to the qubits to map the normalized feature vector into a high-dimensional Hilbert space.

In yet another embodiment of the present disclosure, the anomalies include synthetic biometric patterns generated by at least one of generative adversarial networks, morphing techniques, and deepfake technologies.

In yet another embodiment of the present disclosure, noise-induced inaccuracies are imparted to the high-dimensional space by Noisy Intermediate-Scale Quantum hardware included in the electronic device during the expanding and detecting steps. The method further includes reducing the noise-induced inaccuracies using at least one error mitigation technique, wherein the at least one error mitigation technique comprises zero-noise extrapolation, readout error mitigation, and randomized compiling.

In yet another embodiment of the present disclosure, the method further includes encrypting the received data using a post-quantum cryptographic algorithm.

Another aspect of the present disclosure provides a non-transitory computer-readable recording medium in an electronic device for enhancing detection of fraudulent authentication data. The non-transitory computer-readable recording medium stores instructions which when executed by a hardware processor, performs the steps of the methods described above.

In another aspect of the present disclosure, an electronic device for enhancing detection of fraudulent authentication data is provided that includes a processor and a memory configured to store data. The electronic device is associated with a network and the memory is in communication with the processor and has instructions stored thereon. The instructions which, when read and executed by the processor, cause the electronic device to receive data during an authentication transaction, compute a feature vector from the received data, normalize the feature vector, and encode the normalized feature vector into qubits.

Moreover, the instructions which, when read and executed by the processor, cause the electronic device to expand, using at least one quantum algorithm run by the electronic device, the qubits into a high-dimensional space, detect in the high-dimensional space, anomalies indicative of fraud based on the qubits, and calculate, based on the detected anomalies, a confidence score reflecting a likelihood that the received data is genuine. Furthermore, the instructions which, when read and executed by the processor, cause the electronic device to compare the confidence score against a threshold value, and in response to determining the confidence score fails to satisfy the threshold value, determine the received data requires secondary authentication.

In another embodiment of the present disclosure, wherein the instructions when read and executed by the processor, cause the electronic device to encode the normalized feature vector using at least one of amplitude encoding and angle encoding.

In yet another embodiment of the present disclosure, the received data includes at least one of biometric modality data, identity document image data, and document image data.

In yet another embodiment of the present disclosure, the instructions when read and executed by the processor, cause the electronic device to expand the feature vectors by applying the at least one quantum algorithm to the qubits to map the normalized feature vector into a high-dimensional Hilbert space.

In yet another embodiment of the present disclosure, the anomalies include synthetic biometric patterns generated by at least one of generative adversarial networks, morphing techniques, and deepfake technologies.

In yet another embodiment of the present disclosure, wherein noise-induced inaccuracies are imparted to the high-dimensional space by Noisy Intermediate-Scale Quantum hardware included in the electronic device while expanding the normalized feature vector and detecting anomalies, and the instructions when read and executed by the processor, cause the electronic device to reduce the noise-induced inaccuracies using at least one error mitigation technique. Wherein the at least one error mitigation technique comprises zero-noise extrapolation, readout error mitigation, and randomized compiling.

In yet another embodiment of the present disclosure, the instructions when read and executed by the processor, cause the electronic device to encrypt the received data using a post-quantum cryptographic algorithm.

In yet another aspect of the present disclosure a method for enhancing security against quantum side-channel replay attacks during biometric authentication transactions is provided that includes receiving, by an electronic device, data for a biometric modality of a person during an authentication transaction, computing a feature vector from the received biometric modality data and normalizing the feature vector. The feature vector includes amplitude components. Moreover, the method includes generating a noise vector for the authentication transaction. The noise vector is different for each different authentication transaction.

Furthermore, the method includes selecting amplitude components of the normalized feature vector to be modified, modifying the selected amplitude components using the noise vector, normalizing the modified feature vector, encoding the normalized modified feature vector into qubits, and expanding, using at least one quantum algorithm, the qubits into a high-dimensional space. Additionally, the method includes detecting in the high-dimensional space anomalies indicative of fraud based on the qubits, calculating, based on the detected anomalies, an anomaly score reflecting a likelihood that the received data is genuine, comparing the anomaly score against a threshold value, and in response to determining the anomaly score fails to satisfy the threshold value, determining the received biometric modality data requires secondary authentication.

Another aspect of the present disclosure provides a non-transitory computer-readable recording medium in an electronic device for enhancing security against quantum side-channel replay attacks during biometric authentication transactions. The non-transitory computer-readable recording medium stores instructions, which when executed by a hardware processor, performs the steps of the methods described above.

In yet another aspect of the present disclosure an electronic device for enhancing security against quantum side-channel replay attacks during biometric authentication transactions is provided. The electronic device includes a processor and a memory configured to store data. The electronic device is associated with a network and the memory is in communication with the processor and has instructions stored thereon which, when read and executed by the processor, cause the electronic device to receive data for a biometric modality of a person during an authentication transaction, compute a feature vector from the received biometric modality data and normalize the feature vector. The feature vector includes amplitude components. Moreover, the instructions when read and executed by the processor, cause the electronic device to generate a noise vector for the authentication transaction. The noise vector is different for each different authentication transaction.

Furthermore, the instructions when read and executed by the processor, cause the electronic device to select amplitude components of the normalized feature vector to be modified, modify the selected amplitude components using the noise vector, normalize the modified feature vector, encode the normalized modified feature vector into qubits, and expand, using at least one quantum algorithm operated by the electronic device, the qubits into a high-dimensional space. Additionally, the instructions when read and executed by the processor, cause the electronic device to detect in the high-dimensional space anomalies indicative of fraud based on the qubits, calculate, based on the detected anomalies, an anomaly score reflecting a likelihood that the received data is genuine, compare the anomaly score against a threshold value, and in response to determining the anomaly score fails to satisfy the threshold value, determine the received biometric modality data requires secondary authentication.

BRIEF DESCRIPTION OF THE DRAWINGS

FIG. 7 is a flowchart illustrating an example method and algorithm for enhancing detection of fraudulent authentication data according to an embodiment of the present disclosure;

FIG. 8 is a diagram that illustrates an amplitude encoded vector obtained by an adversary during an authentication transaction and a genuine amplitude encoded vector from a subsequent authentication transaction;

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
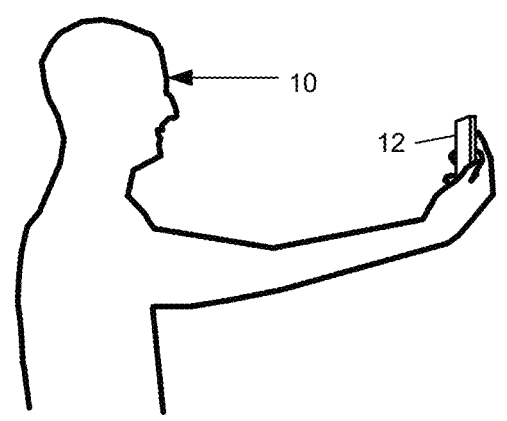
FIG. 1 is a side view of a person operating an example electronic device to capture authentication data.

FIG. 1 is a side view of a person 10 operating an example electronic device 12 to capture authentication data, for example, during an authentication transaction. Authentication data can be any data that may be used, for example, to verify the identity of a person or verify the genuineness of, for example, an identity document. Authentication data that may be used to verify the identity of a person includes, but is not limited to, biometric modality data of the person and biometric templates created from the biometric modality data. Authentication data that may be used to verify the genuineness of an identity document includes an image of the identity document, for example, the driver's license or passport of the person.

Figure 2:
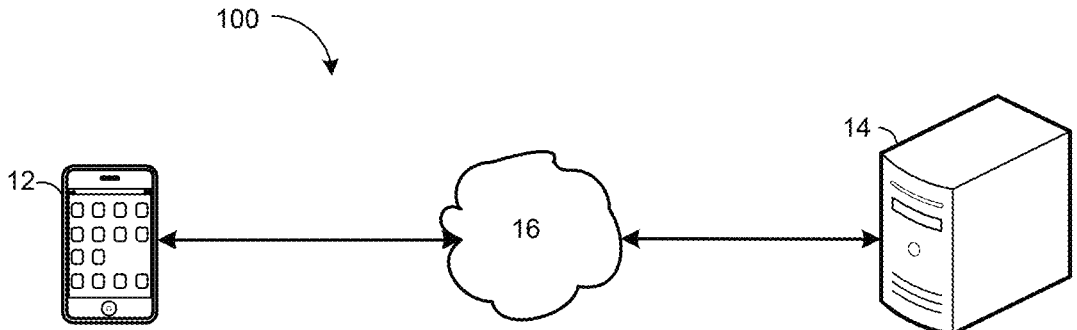
FIG. 2 is a schematic diagram of an example computing system for enhancing detection of fraudulent authentication data according to an embodiment of the present disclosure.

FIG. 2 is a schematic diagram of an example computing system 100 for enhancing detection of fraudulent authentication data according to an embodiment of the present disclosure. As shown in FIG. 2, the main elements of the system 100 include the electronic device 12 and a quantum computer 14 communicatively connected via a network 16.

In FIG. 2, the electronic device 12 can be any wireless hand-held consumer electronic device capable of at least downloading applications over the Internet, running applications, capturing and storing data temporarily and/or permanently, and otherwise performing any and all functions described herein by any non-quantum computer, non-quantum computer system, non-quantum server or non-quantum electronic device included in the system 100. Moreover, the electronic device 12 may alternatively be any type of non-quantum server or non-quantum computer implemented as a network server or network computer. Other examples of the electronic device 12 include, but are not limited to, a cellular phone, a tablet computer, a phablet computer, a laptop computer, a camera and any type of hand-held consumer electronic device having wired or wireless networking capabilities capable of performing the non-quantum functions, methods, and/or algorithms described herein.

Although the electronic device 12 is described herein as performing non-quantum functions, it is contemplated by the present disclosure that the electronic device 12 may include, for example, a quantum processing unit and quantum memory such that the electronic device 12 may perform quantum functions as well as non-quantum functions.

The quantum computer 14 performs quantum functions only. The quantum computer 14 and the electronic device 12 communicate via the network 16. Such communication facilitates combining the capabilities of quantum computing with non-quantum computing to enhance the detection of anomalies in authentication data that may be indicative of synthetic fraud, deep fakes, and tampered authentication data. It is contemplated by the present disclosure that the quantum computer 14 may alternatively be remotely located in a cloud data center.

The network 16 may be implemented as a 5G communications network. Alternatively, the network 16 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 16 may also be any type of wired network or a combination of wired and wireless networks.

It is contemplated by the present disclosure that the number of electronic devices 12 and quantum computers 14 is not limited to the number shown in the system 100. Rather, any number of electronic devices 12 and quantum computers 14 may be included in the system 100.

Figure 3:
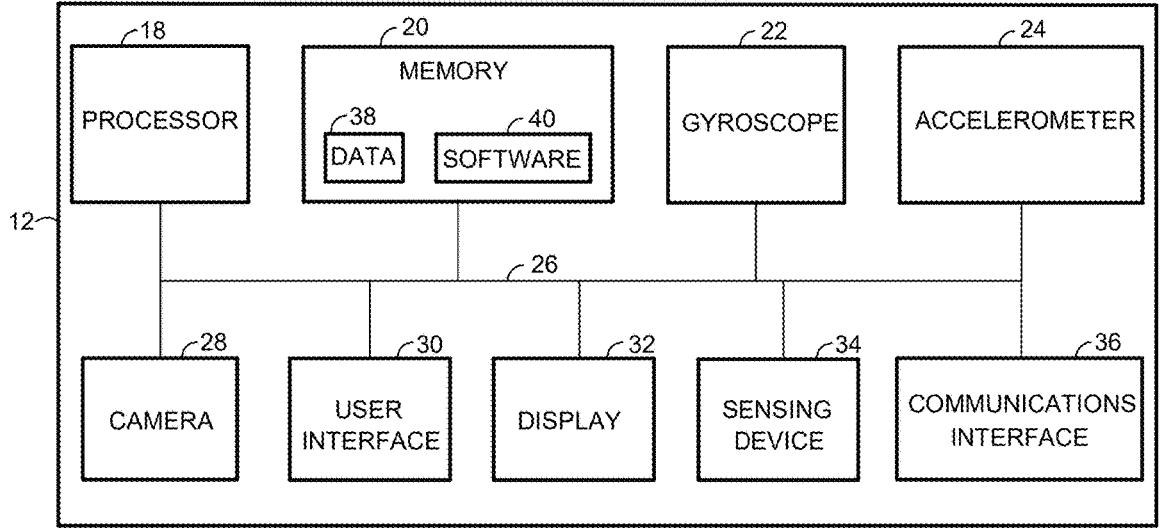
FIG. 3 is a more detailed schematic diagram illustrating the example electronic device used for enhancing detection of fraudulent authentication data and enhancing security against quantum side channel replay attacks according to an embodiment of the present disclosure.

FIG. 3 is a more detailed schematic diagram illustrating the example electronic device 12 used for enhancing detection of fraudulent authentication data and enhancing security against quantum side channel replay attacks, for example, during an authentication transaction according to an embodiment of the present disclosure. The electronic device 12 includes components such as, but not limited to, one or more processors 18, a memory 20, a gyroscope 22, an accelerometer 24, a bus 26, a camera 28, a user interface 30, a display 32, a sensing device 34, and a communications interface 36. General communication between the components in the electronic device 12 is provided via the bus 26.

The processor 18 executes software instructions, or computer programs, stored in the memory 20. It is contemplated by the present disclosure that the number of processors 18 is not limited to the number shown in the electronic device 12. Rather, any number and type of processor(s) 18 may be included in the electronic device 12. As used herein, the term processor is not limited to just those integrated circuits referred to in the art as a processor, but broadly refers to a computer, a microcontroller, a microcomputer, a programmable logic controller, an application specific integrated circuit, a Tensor Processing Unit (TPU), a Graphics Processing Unit (GPU), and any other programmable circuit capable of executing at least a portion of the functions and/or methods described herein. The above examples are not intended to limit in any way the definition and/or meaning of the term "processor." The processor 18 may additionally include a quantum processing unit for performing quantum functions.

The memory 20 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 20 may be used to store any type of data 38, for example, probability distributions, confidence scores, classifications, feature vectors, and data records of people. Each different data record is typically for a different person. The data record for each person may include data such as, but not limited to, authentication data associated with the person, biometric templates, high-dimensionality feature vectors, record high-dimensionality feature vector distributions, facial landmark data, geometric relationships between facial landmarks, and personal data.

A biometric template can be any type of mathematical representation of biometric modality data. Biometric modality data is the data of a biometric modality of a person. For the methods and systems described herein, the biometric modality is face. However, it is contemplated by the present disclosure that the biometric modality may alternatively be any biometric modality that facilitates detecting fraudulent biometric modality data as described herein. Examples of other biometric modalities include, but are not limited to, iris, fingerprint, voice, palm, and behavioral patterns. Moreover, the biometric modality may be any combination of these and/or other biometric modalities including, but not limited to, the combination of voice and face and the combination of face and palm. Behavioral patterns include, but are not limited to, typing patterns and the walking gait of a person.

Biometric modality data may be captured in any manner. For example, for face biometric data, the camera 28 may record image data of the face of a person by taking one or more photographs or digital images of the person, or by taking a video of the person. The camera 28 may record a sequence of digital images at irregular or regular intervals. A video is an example of a sequence of digital images being captured at a regular interval. For voice biometric data, the electronic device 12 may record a person speaking.

Captured biometric modality data may be temporarily or permanently stored in the electronic device 12 or in any device capable of communicating with the electronic device 12 via the network 16. Alternatively, the captured biometric modality data may not be stored. As used herein, capture means to record temporarily or permanently, any data including, for example, biometric modality data of a person.

The term "personal data" as used herein includes any demographic information regarding a person as well as contact information pertinent to the person. Such demographic information includes, but is not limited to, the person's name, age, date of birth, street address, email address, citizenship, marital status, and contact information. Contact information can include devices and methods for contacting the person.

Additionally, the memory 20 can be used to store any type of software 40. As used herein, the term "software" is intended to encompass an executable computer program that exists permanently or temporarily on any non-transitory computer-readable recordable medium that causes, for example, the electronic device 12 to perform at least a portion of the functions, methods, and/or algorithms described herein. Application programs are software and include, but are not limited to, operating systems, Internet browser applications, authentication applications, user liveness detection applications, an artifact detection application, a face tracker application, a feature extraction application, wavelet transforms, Principal Component Analysis (PCA) algorithms, noise generating software, and any other software and/or any type of instructions associated with algorithms, processes, or operations for controlling the general functions and operations of the electronic device 12. The software may also include computer programs that implement buffers and use RAM to store temporary data.

Authentication applications enable the electronic device 12 to conduct user verification and identification (1: C) transactions with any type of authentication data, where "C" is a number of candidates.

Liveness detection applications differentiate between captured data of a biometric modality of a live person and manipulated biometric modality data of a person. Examples of liveness detection include, but are not limited to, analyzing captured data of a biometric modality for eye blink frequency, for replay, for subtle skin texture variations, for depth, for facial structure, and for a pulse. Using liveness detection applications facilitate ensuring that genuine biometric modality data of a person is used, for example, during authentication transactions and while remotely applying for an identity document thus enhancing the accuracy and trustworthiness of authentication transaction results as well as the trustworthiness of, for example, government issued identity documents.

Noise generating software can apply a bounded perturbation $\beta$ to selected amplitude components in a normalized vector based on security requirements. $\beta$-bounded noise is a cryptographically generated perturbation vector $\Delta=[\delta_1, \delta_2, \ldots, \delta_n]$ applied to the selected amplitude components, where each $|\delta_i| \leq \beta$ and $\beta$ is a predefined noise bound. The noise values are within a predefined range of, for example, $\beta \leq 0.1$, such that when the noise values are used to modify selected amplitude components the noise values are within a range that quantum classifiers, for example, QSVM and VQC classifiers are trained to tolerate.

Differential privacy (DP) is a formal mathematical framework that provides privacy guarantees when analyzing or sharing statistical data. DP ensures that the output of a function or algorithm is statistically indistinguishable whether or not any particular individual's data is included in a dataset. DP enhances resilience to model inversion or reconstruction attacks that could otherwise extract biometric details.

$\in$ is considered to be a privacy budget. That is, a parameter controlling the tradeoff between privacy and accuracy. A lower & generally means that there is stronger privacy and more noise. LaPlacian or Gaussian noise may be used to perturb data in a way that meets $\in$-DP guarantees. DP-noise states refers to quantum or classical feature states perturbed by the LaPlacian or Gaussian noise. The DP-noise states may be used to train quantum classifiers, for example, QSVM and VQC classifiers.

The noise generating software may be seeded using an ephemeral key that may be derived from, for example, a trusted challenge response mechanism, secure enclave entropy, or cryptographic nonce exchange. The ephemeral key is typically different for each authentication transaction. As a result, the noise values generated for each transaction are also different.

Noise values may be generated for each different authentication transaction and remain within predefined bounds to preserve genuine-user fidelity. The noise generating software can monitor classification confidence metrics and adaptively increase or decrease the bounded perturbation $\beta$ to maintain a target error-security tradeoff.

The amplitude components to be modified may be selected based on either fixed or guided by importance sampling from a Fisher information matrix or other saliency metric derived from a training set of labeled biometric modality data, such as facial or voice samples, including both genuine and tampered instances. This training set provides statistical guidance on which feature vector components exhibit high discriminative sensitivity or tamper susceptibility.

The training set is used to estimate component-wise discriminative saliency, guiding the selection process either as a fixed rule or dynamically based on importance sampling metrics. The training set may include, for example, facial and voice biometric samples from at least one hundred unique individuals, with synthetic variants generated using, for example, StyleGAN and audio morphing tools. Fisher information is computed across the labeled dataset to assess which normalized feature vector components exhibit the highest discriminative stability under tampering.

A quantum register may be obtained by an adversary or attacker and replayed during an authentication session. The obtained quantum register may or may not have been modified with noise values. Because the noise for each different authentication transaction is different, any noise in the obtained quantum register will fail to match the noise in another authentication transaction and thus the authentication data associated with the obtained quantum register will be identified as fraudulent.

A machine learning algorithm (MLA) may be used to train a machine learning model (MLM) for enhancing detection of morphed biometric modality data. MLMs have parameters which are modified during training to optimize functionality of the models trained using a machine learning algorithm (MLA). The MLM may be retrained using morphed biometric modality data captured, for example, from people applying remotely for identity documents. MLAs include at least classifiers and regressors. Example classifiers are Deep Neural Networks (DNNs), Time Delay Neural Networks (TDNNs), Recurrent Neural Networks (RNNs), Convolutional Neural Networks (CNNs), Residual Networks (ResNets), Generative Adversarial Networks (GANs), transformers, and ensemble learning models.

Principal Component Analysis (PCA) algorithms and wavelet transforms function to convert captured or received biometric data into a condensed feature vector.

The process of verifying the identity of a person is known as a verification transaction or an authentication transaction. Generally, during a verification transaction a biometric template is generated from biometric modality data of a person captured during the transaction. Typically, data for a single biometric modality is captured. The generated biometric template is compared against a corresponding record biometric template of the person and a matching score is calculated for the comparison. If the matching score meets or exceeds a threshold score, the identity of the person is verified as true. Alternatively, the captured biometric modality data may be compared against corresponding record biometric modality data to verify the identity of the person Known methods of biometric authentication have difficulty detecting subtle modifications made to genuine authentication data. The subtle modifications are imperceptible to humans. Providing such modified authentication data while applying, for example, for an identity document is known as a morphing attack.

Convolutional Neural Networks, for example, may be used to extract high-dimensionality feature vectors from biometric modality data captured, for example, during an authentication transaction or while a person applies remotely for an identity document. High dimensionality feature vectors are numerical representations of, for example, biometric modality data that include hundreds or thousands of dimensions. Each dimension corresponds to a distinct feature of the biometric modality. Using high dimensionality feature vectors facilitates the detailed analysis necessary for detecting anomalies that facilitate distinguishing between genuine and morphed biometric modality data.

Convolutional Neural Networks may also be used, for example, to extract high-dimensionality feature vectors from an identity document image captured, for example, while a person remotely establishes a banking account.

High-dimensionality feature vectors may be created from different types of biometric modality data. For example, for facial image data, high dimensionality feature vectors typically range between about 128 and 512 dimensions but have been known to include up to 1,024 dimensions to capture finer details of the face. For iris data, high dimensionality feature vectors typically range between about 200 and 400 dimensions which represent intricate iris patterns. For voice data, high dimensionality feature vectors typically range between about 50 and 600 dimensions which facilitate analyzing the variability in, for example, pitch, tone, and resonance of the voice data. High dimensionality feature vectors created from multi-modal biometric data typically include thousands of dimensions which are necessary to obtain distinct details for each biometric modality.

A Gaussian Mixture Model (GMM), for example, may be used to generate the distribution of the high-dimensionality feature vectors for captured biometric modality data. Any significant deviation of the generated distribution from a record distribution may indicate that the biometric modality data includes anomalies indicative of morphing. A significant deviation between the distribution of captured high-dimensionality feature vectors and the record distribution can indicate that the biometric data likely contains anomalies consistent with morphing. Outputs generated by the GMM may be entered into a Quantum Support Vector Machine (QSVM) for enhanced decision boundaries.

It is contemplated by the present disclosure that in other embodiments the GMM may additionally be trained on genuine and morphed biometric modality data to create a probabilistic classifier.

Morphed data often distorts geometric relationships. As a result, any anomaly or difference detected between the calculated and record geometric relationships may indicate the facial image data was morphed.

When a sequence of digital images is captured, the electronic device 12 may extract images from the sequence and assign a time stamp to each extracted image. An application, for example a face tracker application may process the extracted digital images. The face tracker application may extract data from images including, but not limited to, facial landmarks, facial expressions, and the orientation of the face within the image. The extracted data may be analyzed to determine whether the image or images include anomalies indicative of morphing. For example, the optical flow of facial landmarks may be tracked across sequential video frames to identify unnatural transitions that may be indicative of morphing.

Facial action patterns of the landmarks may also be analyzed to facilitate detecting anomalies in image data. Facial action patterns refer to dynamic changes in facial expressions and movements, analyzed through Action Units (AUs) such as eyebrow raises, lip pursing, and cheek lifts. Unnatural transitions or inconsistencies in these patterns, detected via optical flow analysis or machine learning, may be anomalies indicative of morphing. Additionally, a Recurrent Neural Network (RNN), for example, may be used to model temporal dependencies to facilitate detecting anomalies indicative of morphing such as, but not limited to, motion inconsistencies in micro-expressions or facial movements over time.

The facial landmark data includes data generated by the face tracker application as a result of processing the frames. The generated data includes, but is not limited to, coordinate values for facial landmarks. The coordinate values may include a three-dimensional coordinate value for each different facial landmark. The facial landmarks are identified by the face tracker application on the facial image included in each processed frame. The facial landmarks include, but are not limited to, cheek points, nose points, points on sides of the face, chin points, and points about the eyes and eyebrows.

The facial landmark data may also be used to facilitate detecting anomalies in image data. For example, facial image landmark data may be used to monitor the position of each facial landmark between frames. Additionally, the facial landmark data may be used to calculate geometric relationships between facial landmarks in the same image, for example, the geometric relationships between the tip of the nose and a point on the chin or the distance between the center of the eyes. The calculated geometric relationships can be compared against corresponding record geometric relationships for the person from whom the facial image data was captured. Morphed data often distorts geometric relationships. As a result, any anomaly or difference detected between the calculated and record geometric relationships may indicate the facial image data was morphed.

A temporal differential analysis of the facial landmark data may be conducted to facilitate determining whether any landmarks moved too rapidly between frames which may indicate the sequence of digital images was morphed. Too rapidly can mean moving to a different position within a subsequent frame, but the movement is physically impossible. Moreover, a three-dimensional analysis of each facial landmark may be conducted to facilitate determining whether or not the sequence of digital images was morphed.

When the sequence of digital images includes an audio signal, feature extraction computer programs can process the audio signal to generate a representative feature vector that contains information about the signal. Audio signals can be voice data spoken by a person. Features may be extracted from voice data and analyzed using a trained machine learning model to determine whether the voice data includes anomalies indicative of morphing.

Synthetic speech may mimic the intonation, rhythm, and emotional nuances of genuine human speech. As a result, synthetic speech may be a threat to security systems that use voice data to authenticate or verify the identities of people.

Anomalies may be present in each characteristic that may be associated with synthetic speech. For example, for the range of pitch an anomaly may be that the received voice biometric data has a narrower range of pitch than typically included in authentic speech. For timbre, anomalies can include, but are not limited to, a lack of expected complexity, unusual harmonic structures, and erratic formant movements. For intensity or loudness, an anomaly may be variations in volume that do not correspond with an expressed or expected emotion. For voice resonators, an anomaly may be less variability and responsiveness. For pace, an anomaly may be unnatural timing patterns like a consistent speech rate or abnormal pauses. For prosody, anomalies can include inconsistencies in stress patterns or intonation curves unusual for the context or language norm. For rhythm, anomalies can include unusual pauses or changes in the rhythm of speech such as hesitations or rushed sequences. For natural speech, anomalies can include, but are not limited to, a lack of natural pitch variation across sentences, an unexpected pitch contour within a phrase, unusually long or short durations, or a lack of variability in durations. For frequency, an anomaly can be that the frequency does not exceed a threshold established for synthetic speech, for example, up to 5,354 Hz.

Wavelet transforms can be used to decompose a digital image into multiple frequency bands which facilitate analyzing high and low frequency artifacts in the image. For example, a digital image may be processed by a wavelet transform to decompose the image into high, low and medium frequency artifacts. High-frequency artifacts capture fine details, such as edges and textures, while low-frequency artifacts represent broader, smoother areas of the image. The artifacts imparted to digital images via manipulation associated with morphing are typically high-frequency artifacts. Examples of high-frequency artifacts associated with morphing include, but are not limited to, texture inconsistencies, edge sharpness variations, and pixel level anomalies caused by compression or resampling during morphing. Examples of texture inconsistencies include, but are not limited to, blending irregularities in skin patterns or hairlines. Examples of edge sharpness variations include, but are not limited to, unnatural transitions between facial features.

Wavelet transforms facilitate isolating these high-frequency artifacts to identify unnatural patterns that would not be in an unaltered image. For example, the high-frequency artifacts of a received image may be compared against record high-frequency artifacts of a corresponding bona fide image. Any differences may be the result of morphing. Thus, fine details of the image are checked for manipulation that can be indicative of morphing. Wavelet transforms may generate statistical anomalies, for example, unnatural spectral patterns. Such anomalies may be indicative of morphing.

The gyroscope 26 and the one or more accelerometers 24 generate data regarding rotation and translation of the electronic device 12 that may be communicated to the processor 18 and the memory 20 via the bus 26. The gyroscope 22 and accelerometer 24 are typically included in electronic devices 12 that are primarily mobile, for example, smart phones and other smart devices, but not in electronic devices 12 that are primarily stationary, for example, servers or personal computers. Thus, the electronic device 12 may alternatively not include the gyroscope 22 or the one or more accelerometers 24 or may not include either.

The camera 28 captures image data. The camera 28 can be one or more imaging devices configured to record image data of at least a portion of the body of a user including any biometric modality of the user while utilizing the electronic device 12. The camera 28 may also capture digital images of printed images.

The camera 28 is capable of recording image data under any lighting conditions including infrared light. The camera 28 may be integrated into the electronic device 12 as one or more front-facing cameras and/or one or more rear facing cameras that each incorporates a sensor, for example and without limitation, a CCD or CMOS sensor. Alternatively, the camera 28 can be external to the electronic device 12.

The user interface 30 and the display 32 allow interaction between a user and the electronic device 12. The display 32 may include a visual display screen or monitor that displays information. For example, the display 32 may be a Liquid Crystal Display (LCD), an active-matrix display, plasma display, or cathode ray tube (CRT). The user interface 30 may include a keypad, a keyboard, a mouse, an illuminator, a signal emitter, a microphone, and/or speakers.

Moreover, the user interface 30 and the display 32 may be integrated into a touch screen display. Accordingly, the display 32 may also be used to show a graphical user interface, which can display various data and provide "forms" that include fields that allow for the entry of information by the user. Touching the screen at locations corresponding to the display of a graphical user interface allows the person to interact with the electronic device 12 to enter data, change settings, control functions, etc. Consequently, when the touch screen is touched, the user interface 30 communicates this change to the processor 18, and settings can be changed, or user entered information can be captured and stored in the memory 20. The display 32 may function as an illumination source to apply illumination to an object while image data for the object is captured.

The sensing device 34 may include Radio Frequency Identification (RFID) components or systems for receiving information from other devices (not shown) in the system 100 and for transmitting information to other devices (not shown) in the system 100. The sensing device 34 may alternatively, or additionally, include components with Bluetooth, Near Field Communication (NFC), infrared, or other similar capabilities. Communications between the electronic device 12 of the user and the quantum computer 14 may occur via NFC, RFID, Bluetooth or the like only so a network connection from the electronic device 12 is unnecessary.

The communications interface 36 may include various network cards, and circuitry implemented in software and/or hardware to enable wired and/or wireless communications with other electronic devices 12 (not shown) and the quantum computer 14 via the network 16. Communications include, for example, conducting cellular telephone calls and accessing the Internet over the network 16. By way of example, the communications interface 36 may be a digital subscriber line (DSL) card or modem, an integrated services digital network (ISDN) card, a cable modem, or a telephone modem to provide a data communication connection to a corresponding type of telephone line. As another example, the communications interface 36 may be a local area network (LAN) card (e.g., for Ethernet™ or an Asynchronous Transfer Model (ATM) network) to provide a data communication connection to a compatible LAN. As yet another example, the communications interface 36 may be a wire or a cable connecting the electronic device 12 with a LAN, or with accessories such as, but not limited to, other electronic devices. Further, the communications interface 36 may include peripheral interface devices, such as a Universal Serial Bus (USB) interface, a PCMCIA (Personal Computer Memory Card International Association) interface, and the like.

The communications interface 36 also allows the exchange of information across the network 16. The exchange of information may involve the transmission of radio frequency (RF) signals through an antenna (not shown). Moreover, the exchange of information may be between the electronic device 12 and the quantum computer 14, other electronic devices (not shown), and other computer systems (not shown) capable of communicating over the network 16.

Examples of other computer systems (not shown) include computer systems of service providers such as, but not limited to, financial institutions, medical facilities, national security agencies, merchants, and authenticators. The electronic devices (not shown) may be associated with any user or with any type of entity including, but not limited to, commercial and non-commercial entities.

Figure 4:
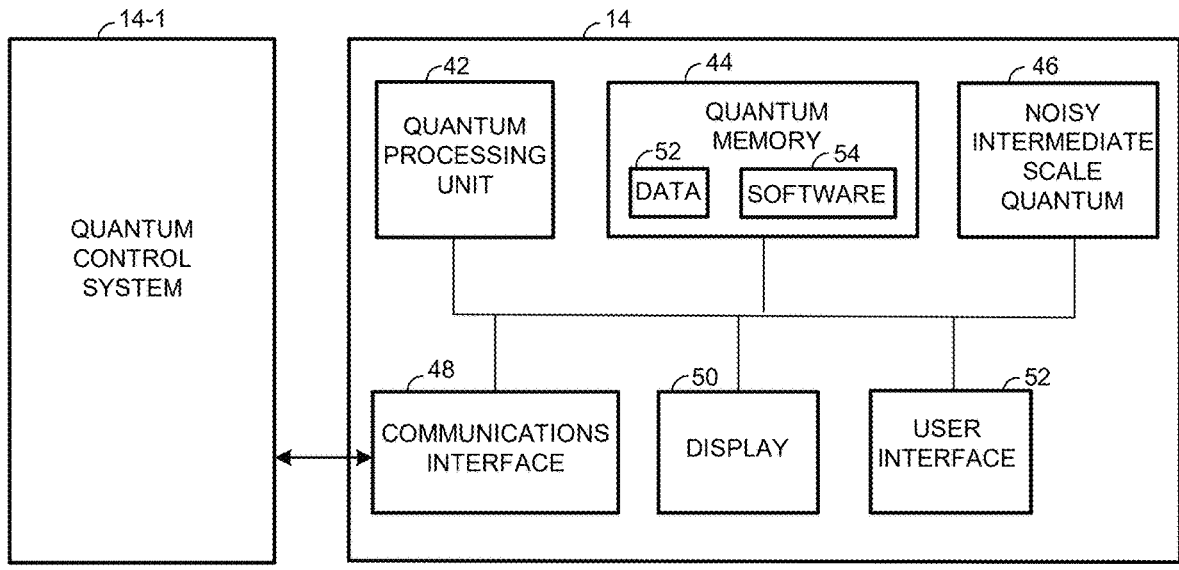
FIG. 4 is a detailed schematic diagram illustrating an example quantum computer and an example quantum control system included in the computing system shown in FIG. 2, used for enhancing detection of fraudulent authentication data according to an embodiment of the present disclosure.

FIG. 4 is a detailed schematic diagram illustrating the example quantum computer 14 and an example quantum control system 14-1 used for enhancing detection of fraudulent authentication data, for example, during an authentication transaction according to an embodiment of the present disclosure. The quantum computer 14 and quantum control system 14-1 are typically proximate each other. It is contemplated by the present disclosure that the quantum computer 14 and quantum control system 14-1 may alternatively be remotely located in a cloud data center.

The quantum computer 14 includes components such as a quantum processing unit 42, a quantum memory 44, noisy intermediate scale quantum (NISQ) 46, a communications interface 48, a user interface 50, and a display 52. The quantum control system 14-1 typically includes components such as, but not limited to, analog-to-digital converters, digital-to-analog converters, and field programmable gate arrays. The components of the quantum computer 14 typically do not communicate using a bus as in non-quantum computers.

Transmissions from, for example, the electronic device 12 to the quantum computer 14 are received by the quantum control system 14-1. The quantum control system 14-1 translates the transmissions into real physical signals for the qubits. The quantum processing unit 42 transmits results, for example, detected anomalies to the quantum control system 14-1, which transmits the results to, for example, the electronic device 12.

The quantum processing unit 42 manipulates qubits instead of bits. Qubits as used herein refers to quantum states. The quantum processing unit 42 receives quantum gate instructions from the quantum control system 14-1 and uses qubits to perform computations.

The quantum memory 44 may store any type of data 54 similar to the data 32 that may be stored in the memory 20 of the electronic device 12. The quantum memory 44 may also store software 56 for performing quantum functions. Such software includes, but is not limited to, amplitude encoding algorithms, angle encoding algorithms, Quantum Support Vector Machines (QSVM), Variational Quantum Circuits (VQC), error mitigation software, and Post Quantum Cryptography (PQC) Algorithms.

The NISQ 46 is hardware that can be characterized by limited qubit counts, higher error rates, and non-trivial decoherence. The NISQ 46 can run error mitigation software. NISQ are quantum processors available today that support tens to hundreds of qubits but are subject to noise and limited circuit depths yet enable quantum algorithm prototyping.

Amplitude encoding algorithms enable encoding a feature vector created, for example, by the electronic device 12 into qubits or a quantum state. Angle encoding algorithms also enable encoding a feature vector created, for example, by the electronic device 12 into qubits or a quantum state. It is contemplated by the present disclosure that the encoding scheme used for encoding a feature vector may be determined based on hardware restraints, data dimensionality, and a desired classification where the classification refers to whether the data is identified as genuine or fraudulent.

Quantum Support Vector Machines (QSVM) facilitate detecting anomalies in authentication data. Feature vectors include floating point numbers that can represent features extracted from authentication data, for example, biometric modality data. The floating point numbers may be referred to herein as features. QSVMs map features in feature vectors into a high-dimensional Hilbert space using quantum kernels, which facilitates enhancing the separation of genuine versus fraudulent authentication data. More specifically, QSVMs are quantum-enhanced classifiers that implement a kernel method on quantum hardware by computing inner products in a high-dimensional Hilbert space via a quantum feature map and perform classical SVM optimization.

VQCs employ parameterized quantum circuits that facilitate detecting anomalies in the high-dimensional Hilbert space indicative of deep fakes or morphed authentication data. Using QSVM and VQC software enables enhanced anomaly detection compared against contemporary techniques using non-quantum hardware and software.

In quantum mechanics, all states of a quantum system can be represented as vectors in a Hilbert space. Hilbert spaces are complex, high-dimensional vector spaces. Unlike non-quantum feature spaces, where each dimension corresponds to a single variable, a quantum state can exist as a super-position of basis states. Authentication data can be encoded into qubits using quantum computing. Each additional qubit effectively doubles the size of the state space, allowing for exponentially greater representational capacity compared to that available using non-quantum feature spaces. As a result, QSVMs and VQCs can reveal subtle correlations and anomalies by analyzing the enlarged state space. As a result, in the context of, for example, authentication transactions, genuine biometric data can be more effectively separated from fraudulent or morphed biometric data to thus enhance the detection of anomalies that contemporary techniques using non-quantum hardware and software would likely miss.

Error mitigation software includes, but is not limited to, zero-noise extrapolation software, read out error mitigation software, and randomized compiling which may be used during QSVM and VQC operations to facilitate reducing noise-induced inaccuracies in anomaly detection. Metrics produced by quantum classifiers, for example, QSVMs and VQCs may be continuously monitored. Parameters of the error mitigation software may be dynamically adjusted based on the monitored metrics. For example, a number of randomized compilation sequences or extrapolation noise points may be adjusted to maintain a predetermined error-security trade-off. By adjusting parameters in real time, high genuine-user acceptance rates are facilitated to be ensured while the probability of a successful replay attack is facilitated to be degraded.

PQC algorithms facilitate encrypting authentication data during transmission, for example, from the quantum computer 14 to the electronic device 12 via the network 16. Moreover, PQC algorithms facilitate encrypting stored biometric data and safeguarding sensitive data against quantum capable adversaries to ensure long term data integrity. PQC algorithms include, but are not limited to, lattice-based encryption algorithms. Encryption provided by PQC algorithms may extend to feature vectors transmitted from the electronic device 12 to the quantum computer 14 via the network 16 or may be limited to final outputs of the quantum computer 14 and stored biometric records.

It is contemplated by the present disclosure that the quantum functions described herein may be performed by a quantum computer, for example the quantum computer 14. Although the electronic device 12 is described herein as performing non-quantum functions, it is contemplated by the present disclosure that the electronic device 12 may include, for example, a quantum processing unit and quantum memory such that the electronic device 12 may perform quantum functions as well as non-quantum functions.

It is contemplated by the present disclosure that the electronic device 12, quantum computer 14 and any other computer devices (not shown) and/or systems (not shown) that may be in the computing system 100 may be implemented in a cloud environment.

The communications interface 48, user interface 50, and display 52 are similar to the communications interface 36, interface 30, and display 32, respectively, described herein with regard to the electronic device 12.

Figures 5, 6:
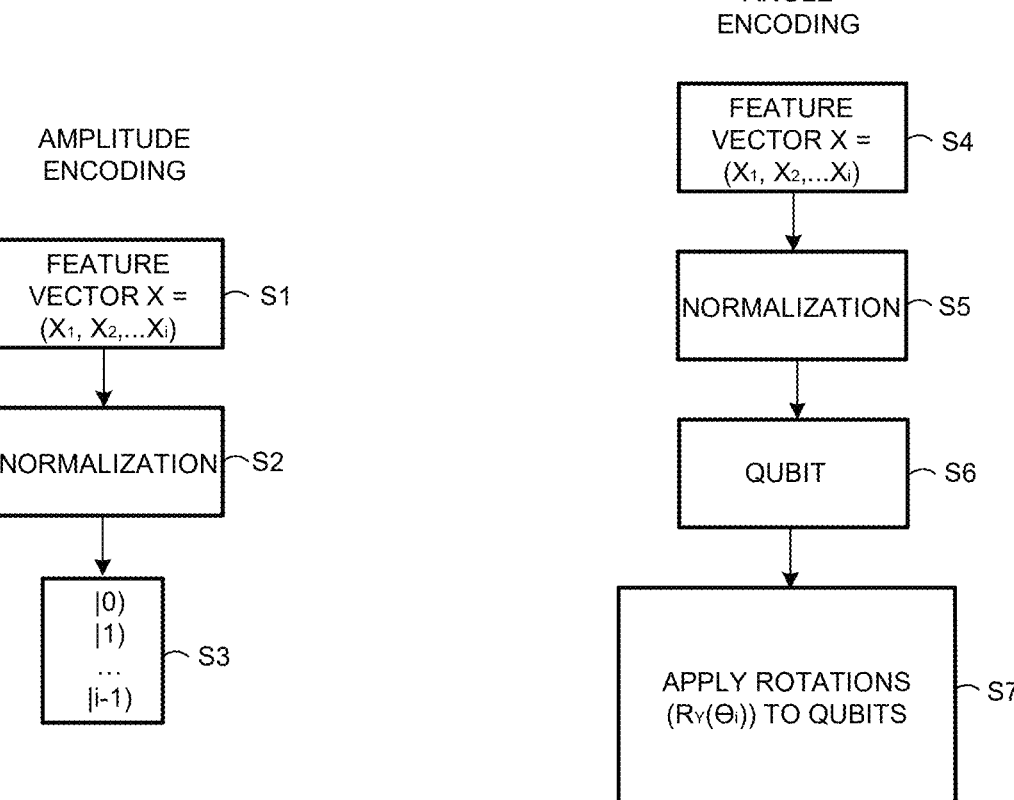
FIG. 5 is a flowchart illustrating an example method and algorithm for encoding feature vectors using amplitude encoding according to an embodiment of the present disclosure.
FIG. 6 is a flowchart illustrating an example method and algorithm for encoding feature vectors according to an embodiment of the present disclosure.

FIG. 5 is a flowchart illustrating an example method for encoding feature vectors using amplitude encoding according to an embodiment of the present disclosure. The electronic device 12 can implement the non-quantum software instructions while a person operating the electronic device 12 captures biometric modality data from his or herself during, for example, an authentication transaction. FIG. 5 illustrates example operations performed when the electronic device 12 runs non-quantum software 40 stored in the memory 20 and the quantum computer 14 receives quantum gate instructions from the quantum control system 14-1 and uses qubits to perform computations.

In step S1, the software 40 executed by the processor 18 causes the electronic device 12 to capture biometric modality data of the person during, for example, an authentication transaction and to create a feature vector from the captured biometric modality data. The feature vector may be expressed as $X=(x_1, x_2 \ldots x_n)$, where $x_1, x_2 \ldots x_n$ are floating point numbers that can represent features extracted from the captured biometric modality data. Next, in step S2, the software 40 executed by the processor 18 causes the electronic device 12 to normalize the feature vector according to the equation $\Sigma_i \, xi^2=1$ and to transmit the normalized feature vector to the quantum computer 14 via the network 16.

In step S3, the quantum computer 14 creates qubits from the floating point numbers such that each floating point number becomes the amplitude of a corresponding qubit.

Thus, each floating point number represents an amplitude in the quantum state, ensuring that $$\sum x_i^2 = 1.$$

For example, the corresponding qubit for the floating point $x_i$ could be $|i\rangle$. As another example, a two-dimensional vector $X=(x_1, x_2)$ can be mapped to as $x_1|0\rangle+x_2|1\rangle$. The thus created qubits represent an encoded version of the feature vector X.

FIG. 6 is a flowchart illustrating an example method for encoding feature vectors using angle encoding according to an embodiment of the present disclosure. The electronic device 12 can implement the non-quantum software instructions while a person operating the electronic device 12 captures biometric modality data from his or herself during, for example, an authentication transaction. FIG. 6 illustrates example operations performed when the electronic device 12 runs non-quantum software 40 stored in the memory 20 and the quantum computer 14 receives quantum gate instructions from the quantum control system 14-1 and uses qubits to perform computations.

In step S4, the software 40 executed by the processor 18 causes the electronic device 12 to capture biometric modality data of the person during, for example, an authentication transaction and to create a feature vector from the captured biometric modality data. The feature vector may be expressed as $X=(x_1, x_2 \ldots x_n)$, where $x_1, x_2 \ldots x_n$ are floating point numbers that can represent features extracted from the captured biometric modality data. Next, in step S5, the software 40 executed by the processor 18 causes the electronic device 12 to normalize the feature vector according to the equation $$\sum x_i^2 = 1$$

and to transmit the normalized feature vector to the quantum computer 14 via the network 16.

In step S6, the quantum computer 14 creates qubits from the floating point numbers such that each floating point number becomes a rotation angle of a corresponding qubit. Thus, each floating point number represents a rotation angle $\theta_i$.

Typically, a qubit is rotated about an axis, for example, the Y or Z-axis. Next, in step S7, the quantum computer 14 applies the rotations $R_y$ ($\theta_i$) to the respective qubits. For example, applying $R_y$ ($\theta_i$) to $|0\rangle$ yields $$\cos\left(\frac{\theta i}{2}\right)|0\rangle + \sin\left(\frac{\theta i}{2}\right)|1\rangle.$$

It should be understood that while amplitude encoding adjusts amplitudes of quantum states directly, angle encoding uses rotation gates to embed feature values. This distinction ensures the correct quantum state is created based on the chosen encoding scheme.

Known identity proofing and fraud detection techniques rely heavily on rule-based engines, neural networks, and statistical algorithms, to verify the authenticity of biometric or document data. However, the emergence of generative technologies like deep fake tools and synthetic data generators have exposed vulnerabilities in these techniques.

These techniques have been known to miss cases of synthetic or tampered identities characterized by subtle, generative adversarial network-based anomalies or morphing attempts. Additionally, these known techniques have been known to fail to capture nuanced patterns in high-dimensional biometric data, resulting in both false negatives and an inability to pinpoint sophisticated deepfake artifacts. Additionally, attackers have been increasingly using fraudulent multi-modal authentication data, for example, image data, audio data, and document image data, to increase the difficulty of detection using known techniques. Moreover, environmental noise, legitimate user variations, and constrained feature sets can cause known techniques to generate inaccurate results which undermine users' experiences and confidence.

In view of the above, it can be seen that known techniques of identity proofing and fraud detection are losing their efficacy as trustworthy and accurate methods of authenticating identities and enhancing security against attackers.

To solve the above problems, the electronic device 12 may receive biometric modality data of a person during an authentication transaction, compute a feature vector from the received data, and normalize the feature vector. The electronic device 12 may transmit via the network 16 the normalized feature vector to the quantum computer 14 via which encodes the normalized feature vector into qubits. The quantum computer 14 may use at least one quantum algorithm to expand the normalized feature vector into a high-dimensional space and detect in the high-dimensional space anomalies indicative of fraud based on the qubits. The detected anomalies may be transmitted from the quantum computer 14 via the network 16 to the electronic device 12. The electronic device 12 may use the detected anomalies to calculate a confidence score reflecting the likelihood that the received biometric modality data is genuine and compare the confidence score against a threshold value. In response to determining the confidence score fails to satisfy the threshold value, the electronic device 12 can determine that the received biometric modality data requires secondary authentication.

FIG. 7 is a flowchart illustrating an example method and algorithm for enhancing the detection of fraudulent authentication data during, for example, an authentication transaction according to an embodiment of the present disclosure. When a person desires to conduct an activity, the person may be required to prove his or her identity before being permitted to conduct the activity. Example activities include, but are not limited to, remotely conducting a financial transaction, remotely applying to open an account or enroll in a service, and entering a country as part of border security. FIG. 7 illustrates example operations performed when the electronic device 12 runs software 40 stored in the memory 20 and the quantum computer 14 receives quantum gate instructions from the quantum control system 14-1 and uses qubits to perform computations.

In step S8, the software 40 executed by the processor 18 causes the electronic device 12 to receive authentication data of a person. For example, the authentication data may be captured by another electronic device (not shown) in the system 100 and transmitted via the network 16 to the electronic device 12 for receipt by the electronic device 12. Alternatively, the person may operate the electronic device 12 to capture authentication data. As a result of capturing the authentication data the electronic device 12 also receives the authentication data. In this example method the authentication data is facial biometric data of a person. The facial biometric data may be an image of the person's face. The biometric modality may alternatively be any modality that may be used to verify the identity of the person as described herein. The received authentication data may be processed after receipt to ensure image quality. For example, the received authentication data may be processed to reduce noise, for image enhancement, and dimensionality reduction to ensure image quality.

In step S9, the software 40 executed by the processor 18 causes the electronic device 12 to compute a feature vector from the received facial biometric data. The software 40 that may be used to compute the feature vector includes, for example, principal component analysis models and wavelet transforms. In step S10, the software 40 executed by the processor 18 causes the electronic device 12 to normalize the feature vector and transmit via the network 16 the normalized feature vector to the quantum computer 14.

Next, in step S11, the quantum computer 14 encodes the normalized feature vector into qubits, or quantum states. The normalized feature vector may be encoded into qubits using, for example, amplitude or angle encoding techniques as described herein with regard to FIGS. 5 and 6, respectively.

In step S12, the quantum computer 14 expands the qubits into a high dimensional space, for example, a Hilbert high dimensional space. Next, in step S13, the quantum computer 14 detects in the high dimensional space anomalies indicative of fraud based on the qubits and transmits via the network 16 the detected anomalies to the electronic device 12. It is contemplated by the present disclosure that the quantum computer 14 encrypts the detected anomalies before transmission to the electronic device 12. Post quantum cryptography algorithms, for example, may be used to encrypt the detected anomalies.

Quantum Support Vector Machines (QSVM) facilitate detecting anomalies in authentication data. Feature vectors include floating point numbers that can represent features extracted from authentication data, for example, biometric modality data. The floating point numbers may be referred to herein as features. More specifically, QSVMs map features in feature vectors into a high-dimensional Hilbert space using quantum kernels, which facilitates enhancing the separation of genuine versus fraudulent authentication data. VQCs employ parameterized quantum circuits that facilitate detecting anomalies in the high-dimensional Hilbert space indicative of deep fakes or morphed authentication data. Using QSVM and VQC software enables enhanced anomaly detection compared against contemporary techniques using non-quantum hardware and software.

In quantum mechanics, all states of a quantum system can be represented as vectors in a Hilbert space. Hilbert spaces are complex, high-dimensional vector spaces. Unlike non-quantum feature spaces, where each dimension corresponds to a single variable, a quantum state can exist as a superposition of basis states. Authentication data can be encoded into qubits using quantum computing. Each additional qubit effectively doubles the size of the state space, allowing for exponentially greater representational capacity compared to that available using non-quantum feature spaces. As a result, QSVMs and VQCs can reveal subtle correlations and anomalies by analyzing the enlarged state space. As a result, in the context of, for example, authentication transactions, genuine biometric data can be more effectively separated from fraudulent or morphed biometric data to thus enhance the detection of anomalies that contemporary techniques using non-quantum hardware and software would likely miss.

In step 14, the software 40 executed by the processor 18 causes the electronic device 12 to calculate, based on the detected anomalies, a confidence score reflecting the likelihood that the received data is genuine. Next, in step S15, the software 40 executed by the processor 18 causes the electronic device 12 to compare the confidence score against a confidence threshold value. If the confidence score satisfies the confidence threshold value, in step S16, the software 40 executed by the processor 18 causes the electronic device 12 to determine that the received facial biometric data is genuine. However, when the confidence score fails to satisfy the confidence threshold value, in step S17, the software 40 executed by the processor 18 causes the electronic device 12 to determine that the received facial biometric data may not be genuine and as a result that secondary authentication is required. Secondary authentication includes, but is not limited to, manual review or other contemporary biometric authentication methods.

Although the example method and algorithm for enhancing the detection of fraudulent data describes transmitting detected anomalies to the electronic device 12, the quantum computer 14 may additionally calculate and transmit a performance score. The performance score can reflect, for example, that the detected anomalies correspond to the received biometric modality and the number of detected anomalies. If an adequate number of anomalies is not detected and/or the anomalies do not correspond to the received biometric modality, accurate and trustworthy authentication transaction results cannot be generated. The adequate number of detected anomalies may be determined, for example, based on expected patterns for the modality of received biometric data or using a statistically based anomaly number threshold value. Should the number of detected anomalies satisfy the anomaly number threshold value, the number of detected anomalies can be adequate; otherwise, not.

The anomaly number threshold value described herein may be satisfied when an anomaly score based on the number of anomalies is greater than or equal to the anomaly number threshold value. Other anomaly number threshold values may be satisfied when the anomaly score is less than or equal to the anomaly number threshold value. Alternatively, the anomaly number threshold value may include multiple anomaly number threshold values, each of which is required to be satisfied to satisfy the anomaly number threshold value.

The performance score can be generated, for example, by comparing the number, nature, or distribution of detected anomalies against an expected baseline for the particular biometric modality. For example, the quantum computer 14 might assess how closely the detected anomalies match known morphing or synthetic patterns typical of that modality. A higher degree of mismatch can lower the performance score, indicating insufficient or irrelevant anomaly detection. Conversely, if the anomalies align well with what the modality analysis anticipates, the performance score increases. This calculation ensures that not only the quantity of anomalies is considered, but also their consistency with the received data type. Tracking the performance score enables deciding whether more anomalies are needed or if a different approach to detecting anomalies should be used.

Thus, the performance score can be used to improve the performance of the quantum computer 14. For example, the detected anomalies and calculated performance score can be transmitted to the electronic device 12, which determines whether the performance of the computer 14 is satisfactory based on the performance score. The electronic device 12 may compare the performance score against a performance threshold value. If the performance score satisfies the performance threshold value, the electronic device 12 calculates the confidence score in step S15. Otherwise, the electronic device 12 can transmit the normalized feature vectors and feedback to the quantum computer 14.

Feedback may include, for example, that more anomalies are required, that the anomalies do not correspond to the received biometric modality, or both. In response, the quantum computer 14 again detects anomalies and calculates the performance score and transmits the detected anomalies and performance score to the electronic device 12. It is contemplated by the present disclosure that the electronic device 12 and the quantum computer 14 may repeatedly communicate as described above until a satisfactory performance score is calculated. Such repeated communications between the electronic device 12 and the quantum computer 14 reflect the synergy between them.

The performance threshold value described herein may be satisfied when the performance score is greater than or equal to the performance threshold value. Other performance threshold values may be satisfied when the performance score is less than or equal to the performance threshold value. Alternatively, the performance threshold value may include multiple performance threshold values, each of which is required to be satisfied to satisfy the performance threshold value.

It is contemplated by the present disclosure that the synergy between non-quantum and quantum computing enables sub-second or near-real-time anomaly detection. Although current NISQ hardware may introduce overhead for data encoding and qubit measurement, the combination of non-quantum and quantum computing described herein facilitates maintaining low-latency performance by leveraging fast non-quantum pre-processing and error-mitigation techniques that minimize the duration of quantum operations. For example, in high-throughput environments such as border checkpoints or financial transactions, the method described herein with regard to FIG. 7 may be executed in under a few seconds, effectively blocking fraudulent attempts without noticeable delay. As quantum gate fidelities and qubit counts continue to improve, latencies will further decrease, causing instantaneous or near-instantaneous accurate and trustworthy authentication transaction results.

Using the example methods and algorithms for enhancing detection of fraudulent authentication data described herein facilitates seamlessly combining the capabilities of quantum computing and non-quantum computing to enhance the detection of deep fakes, synthetic speech and morphing attacks. As a result, limitations of purely non-quantum computing techniques are facilitated to be overcome and the accuracy and trustworthiness of authentication transactions and fraud detection results are facilitated to be enhanced.

FIG. 8 is a diagram illustrating an example amplitude encoded vector 56 obtained by an adversary, for example, during an authentication transaction and a genuine amplitude encoded vector 58 from a subsequent authentication transaction. The genuine amplitude encoded vector is modified by noise. Using known techniques, an amplitude encoded vector captured via side channel during, for example, an authentication transaction may be reused in subsequent authentication transactions because the structure of the amplitude encoded vector remains static.

However, as described herein, the noise values used to modify amplitude encoded vectors are different for each authentication transaction. Thus, the noise introduces an unpredictable element into the amplitude encoded vector that cannot be predicted or anticipated by an adversary. The noise may be random. As a result, an adversary or attacker cannot feasibly guess or reverse-engineer the noise without access to an ephemeral key and cannot distinguish which amplitudes were modified. Genuine users are unaffected, as quantum classifiers, for example, QSVMs and VQCs are noise-tolerant by design. Even with moderate noise bounds, the QSVM/VQC accuracy on genuine biometric samples remains effectively unchanged, demonstrating noise tolerance.

As a result, amplitude encoded vectors generated for previous authentication transactions cannot be successfully used by adversaries or attackers in subsequent authentication transactions. Amplitude-encoded vectors provided during authentication transactions can be monitored for reuse. In response to discovering a reused amplitude encoded vector during an authentication transaction, measures may be implemented that minimize the impact to, for example, sensitive information.

Figure 9:
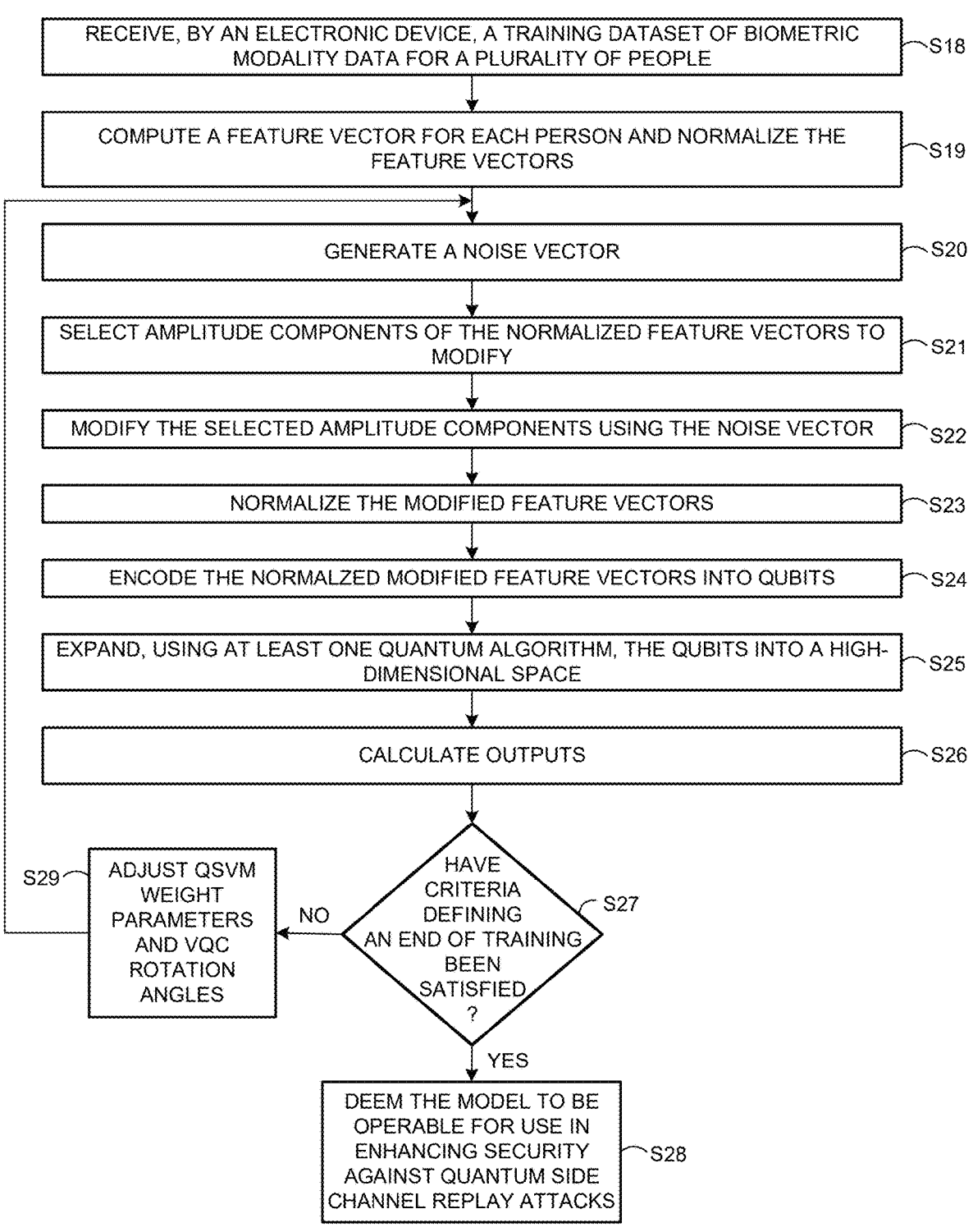
FIG. 9 is a flowchart illustrating an example hybrid quantum-classical method and algorithm for training a machine learning model according to an embodiment of the present disclosure.

FIG. 9 is a flowchart illustrating an example hybrid quantum-classical method and algorithm for training a machine learning model for enhancing detection of fraudulent authentication data by enhancing security against quantum side-channel replay attacks during, for example, authentication transactions. FIG. 9 illustrates example operations performed when the electronic device 12 runs software 40 stored in the memory 20 and the quantum computer 14 receives quantum gate instructions from the quantum control system 14-1 and uses qubits to perform computations. A user may cause the computing device 10 to run the software 40 or the computing device 10 may automatically run the software 40.

In step S18, the software 40 executed by the processor 18 causes the electronic device 12 to obtain a training dataset of biometric modality data for a plurality of people. The biometric modality data may be for example, facial image data. Alternatively, the biometric data may be for any other modality or for any combination of modalities.

Next, in step S19, the software 40 executed by the processor 18 causes the electronic device 10 to compute a feature vector from the biometric modality data for each person and normalize the feature vectors. In step S20, the software 40 executed by the processor 18 causes the electronic device 10 to generate noise in the form of a noise vector and then in step S21, to select amplitude components of the normalized feature vectors to modify with the noise vector.

In step S22, the software 40 executed by the processor 18 causes the electronic device 10 to modify the selected amplitude components using the noise vector. Modifying the selected amplitude components also modifies the feature vector. In step S23, the software 40 executed by the processor 18 causes the electronic device 10 to normalize the modified feature vector and to transmit via the network 16 the normalized modified feature vector to the quantum computer 14.

Next, in step S24, the quantum computer 14 encodes the normalized feature vector into qubits, or quantum states. The normalized feature vector may be encoded into qubits using, for example, amplitude or angle encoding techniques. In step S25, the quantum computer 14 expands the normalized modified feature vector into a high dimensional space, for example, a Hilbert high dimensional space. In step S26, the quantum computer 14 calculates outputs, for example, kernel inner products using QSVM and VQC and transmits via the network 16 the calculated outputs to the electronic device 12.

It is contemplated by the present disclosure that the quantum computer 14 may encrypt the calculated outputs before transmission to the electronic device 12. Post quantum cryptography algorithms, for example, may be used to encrypt the calculated outputs.

In step S27, the software 40 executed by the processor 18 causes the electronic device 10 to determine whether criteria defining the end of training have been satisfied. When the criteria defining the end of training have been satisfied, in step S28, training is considered complete and the model can be deemed operable for use in enhancing security against quantum side-channel replay attacks during authentication transactions.

Otherwise, a new iteration occurs and, in step S29, the software 40 executed by the processor 18 causes the electronic device 10 to adjust QSVM weight parameters and VQC rotation angles based on the calculated outputs. Next, in step S20, the software 40 executed by the processor 18 causes the electronic device 10 to generate a noise vector. The generated noise vector is different than previous noise vectors.

It is contemplated by the present disclosure that steps S20 to S27 and step S29 may be repeatedly conducted until the criteria defining the end of training are satisfied in step S27.

Although the QSVM weight parameters and VQC rotation angles are adjusted based on the calculated outputs in the example method and algorithm for training a machine learning model described herein, it is contemplated by the present disclosure that gradient estimates may alternatively be calculated from the calculated outputs using parameter shift rules or support-vector margins. The gradient estimates may additionally, or alternatively, be used to adjust the QSVM weight parameters and VQC rotation angles.

Using the described method and algorithm for training a machine learning model facilitates creating a machine learning model that enables enhancing security against quantum side-channel replay attacks during, for example, authentication transactions. As a result, the machine learning model facilitates quickly generating accurate and trustworthy authentication transaction results from captured voice biometric data and facilitates reducing costs for generating such results.

Figure 10:
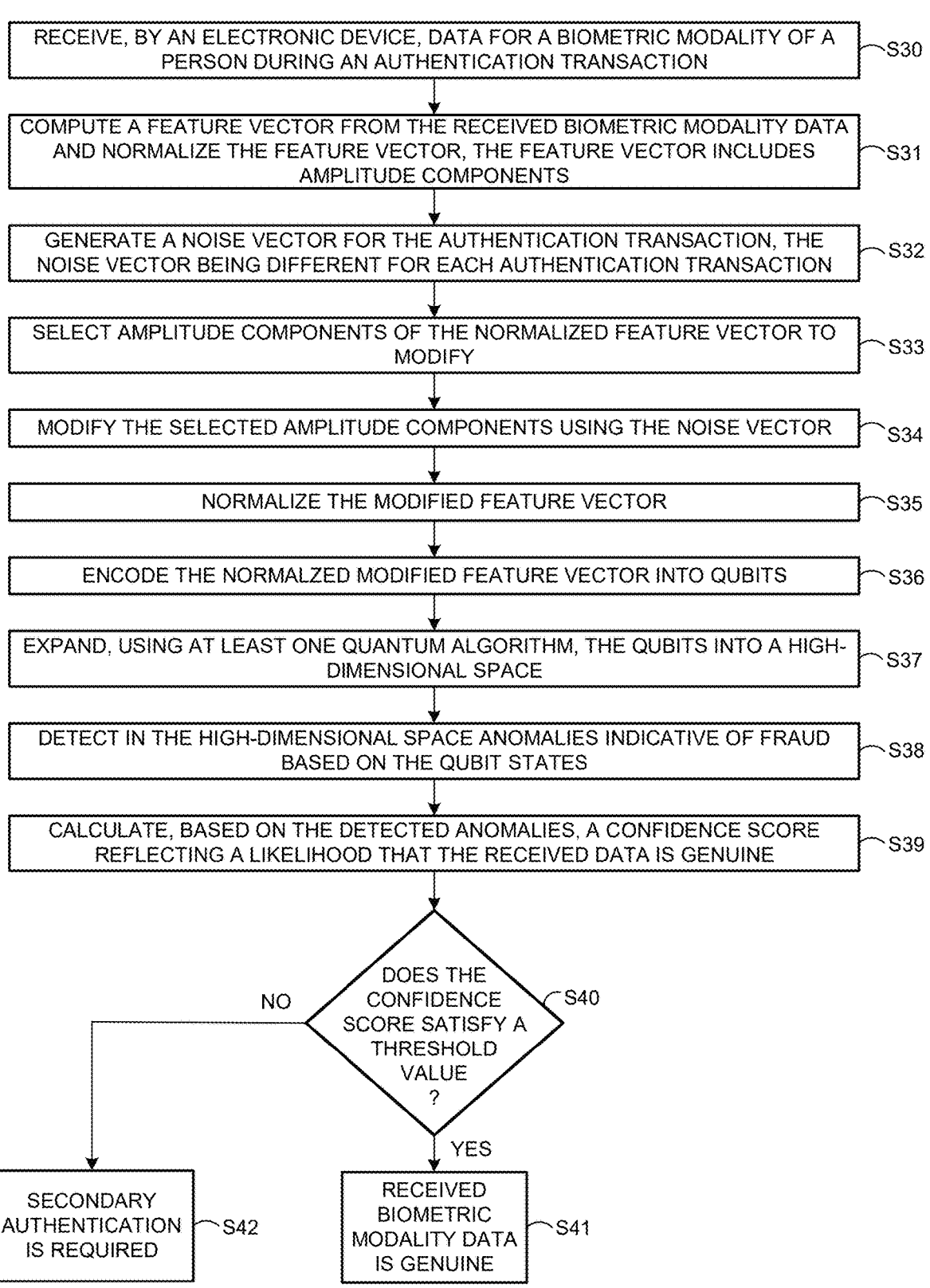
FIG. 10 is a flowchart illustrating an example method and algorithm for enhancing detection of fraudulent authentication data by enhancing security against quantum side channel replay attacks according to an embodiment of the present disclosure.

FIG. 10 is a flowchart illustrating an example method and algorithm for enhancing detection of fraudulent data by enhancing security against quantum side-channel replay attacks during, for example, authentication transactions according to an embodiment of the present disclosure. The example method and algorithm illustrated in FIG. 10 may be implemented by a machine learning model trained to enhance security against quantum side channel replay attacks, for example, as described herein with regard to the flowchart illustrated in FIG. 9.

When a person desires to conduct an activity, the person may be required to prove his or her identity before being permitted to conduct the activity. Example activities include, but are not limited to, remotely conducting a financial transaction, remotely applying to open an account or enroll in a service, and entering a country as part of border security. FIG. 10 illustrates example operations performed when the electronic device 12 runs software 40 stored in the memory 20 and the quantum computer 14 receives quantum gate instructions from the quantum control system 14-1 and uses qubits to perform computations.

In step S30, the software 40 executed by the processor 18 causes the electronic device 12 to receive data for a biometric modality of a person during, for example, an authentication transaction. The biometric modality data may be captured by another electronic device (not shown) in the system 100 and transmitted via the network 16 to the electronic device 12 for receipt by the electronic device 12. Alternatively, the person may operate the electronic device 12 to capture the biometric modality data. As a result of capturing the authentication data the electronic device 12 also receives the authentication data.

In this example method the biometric modality is face. Thus, the biometric modality data may be an image of the person's face. The biometric modality may alternatively be any modality, or combinations of modalities, that may be used to verify the identity of the person as described herein. For example, the biometric modality may be face and voice. Biometric data for face and voice may be captured in, for example, a video.

The received biometric modality data may be processed after receipt to ensure image quality. For example, the received biometric modality data may be processed to reduce noise, for image enhancement, and dimensionality reduction to ensure image quality.

In step S31, the software 40 executed by the processor 18 causes the electronic device 12 to compute a feature vector from the received biometric modality data and to normalize the feature vector. The feature vector includes amplitude components. The feature vector may be normalized such that the squared amplitude components sum to one (1.0). When the biometric modality includes a plurality of modalities, a feature vector is computed for each modality. The software 40 that may be used to compute the feature vector includes, for example, principal component analysis models and wavelet transforms.

In step S32, the software 40 executed by the processor 18 causes the electronic device 12 to generate a noise vector for the biometric authentication transaction. The noise vector includes a plurality of noise values. The noise values are generated using a cryptographically secure pseudorandom function seeded with an ephemeral key. Alternatively, noise values can be generated by a differential-privacy mechanism, for example, a LaPlacian or Gaussian distribution.

The ephemeral key may be derived from, for example, secure enclave entropy, cryptographic nonce exchange, or a trusted challenge-response mechanism. Thus, the ephemeral key may be a hardware-derived or a network provided nonce. A different ephemeral key is typically generated for each different authentication transaction. As a result, the noise vector is also different for each different biometric authentication transaction. Thus, the noise vector may be considered random.

The noise values are within a predefined range of, for example, $\beta \leq 0.1$, ensuring that genuine biometric variation is preserved while introducing entropy into the normalized feature vector that an attacker cannot predict or replicate. $\beta$-bounded noise is a cryptographically generated perturbation vector $\Delta = [\delta_1, \delta_2, \ldots, \delta_n]$ applied to select amplitude components, where each $|\delta_i| \leq \beta$ and $\beta$ is a predefined noise bound.

Next, in step S33, the software 40 executed by the processor 18 causes the electronic device 12 to select amplitude components of the normalized feature vector, or vectors, to modify. The amplitude components to be modified may be selected based on either fixed or guided by importance sampling from a Fisher information matrix or other saliency metric derived from a training set of labeled biometric modality data, such as facial or voice samples, including both genuine and tampered samples. This training set provides statistical guidance on which feature vector components exhibit high discriminative sensitivity or tamper susceptibility.

The training set is used to estimate component-wise discriminative saliency, guiding the selection process either as a fixed rule or dynamically based on importance sampling metrics. The training set may include biometric modality data, for example, facial and voice biometric data from at least one hundred unique individuals, with synthetic variants generated using, for example, StyleGAN and audio morphing tools. Fisher information is computed across the labeled dataset to assess which normalized feature vector components exhibit the highest discriminative stability under tampering.

In step S34, the software 40 executed by the processor 18 causes the electronic device 12 to modify the selected amplitude components using the noise vector. For example, a noise value may be added to or subtracted from each selected amplitude component. By virtue of modifying the selected amplitude components the normalized feature vector is also modified. Additionally, entropy is introduced between authentication transactions that remains opaque to attackers, even if quantum intercept-resend or state-reconstruction techniques are employed. It is contemplated by the present disclosure that the normalized feature vector may additionally, or alternatively, be modified to account for noise by applying a differential privacy mechanism with a LaPlacian distribution calibrated to an $\in$-DP budget, which ensures formal privacy guarantees for biometric input data.

In step S35, the software 40 executed by the processor 18 causes the electronic device 12 to normalize the modified feature vector and transmit via the network 16 the normalized modified feature vector to the quantum computer 14. The modified feature vector is normalized to conform with quantum encoding constraints. For example, the modified feature vector may be normalized using L2 normalization. L2 normalization requires dividing the modified feature vector by its Euclidean norm so the sum of squared components equals one which ensures validity for amplitude encoding. Moreover, the normalized modified feature vector may be dimensionally reduced.

Next, in step S36, the quantum computer 14 encodes the normalized feature vector into qubits, or quantum states. The normalized modified feature vector may be encoded into qubits using, for example, amplitude or angle encoding techniques as described herein with regard to FIGS. 5 and 6, respectively. For example, sixty-four feature components may be mapped into the amplitude values of a quantum state prepared using $\lceil \log_2 (64) \rceil = 6$ qubits. When the biometric modality comprises a plurality of modalities, for example, face and voice the normalized modified feature vectors for each modality may be separately encoded and combined via a tensor product operation, to form a single multimodal quantum state suitable for entanglement and measurement.

In step S37, the quantum computer 14 expands the qubits or quantum states into a high dimensional space, for example, a Hilbert high dimensional space. More specifically, features from the normalized modified feature vector may be mapped from the normalized modified feature vector into a high-dimensional space, for example, a Hilbert high dimensional space. It is contemplated by the present disclosure that each qubit or quantum state may be tagged with a cryptographic timestamp, cryptographic state identifier, or an authentication transaction identifier prior to expansion. The timestamps and/or identifiers may be compared against respective data collected during previous authentication transactions. A match may indicate the received biometric modality data is fraudulent. As a result, upon detecting a match measures may be implemented that minimize the impact to, for example, sensitive information.

Next, in step S38, the quantum computer 14 detects in the high dimensional space anomalies indicative of fraud based on the qubits and transmits via the network 16 the detected anomalies to the electronic device 12. It is contemplated by the present disclosure that the quantum computer 14 encrypts the detected anomalies before transmission to the electronic device 12. Post quantum cryptography algorithms, for example, may be used to encrypt the detected anomalies.

Quantum Support Vector Machines (QSVM) facilitate detecting anomalies in authentication data. Feature vectors include floating point numbers that can represent features extracted from authentication data, for example, biometric modality data. The floating point numbers may be referred to herein as features. QSVMs map features in feature vectors into a high-dimensional Hilbert space using quantum kernels, which facilitates enhancing the separation of genuine versus fraudulent authentication data. QSVMs are quantum-enhanced classifiers that implement a kernel method on quantum hardware by computing inner products in a high-dimensional Hilbert space via a quantum feature map and perform classical SVM optimization.

VQCs are trained via a classical-quantum feedback loop, wherein quantum gates' rotation angles are optimized to minimize a cost function, for example, a classification error using gradient-based or gradient-free methods. VQCs employ parameterized quantum circuits that facilitate detecting anomalies in the high-dimensional Hilbert space indicative of deep fakes or morphed authentication data. QSVMs and VQCs may be more tolerant to genuine amplitude variability but are sensitive to anomalous or static patterns such as those resulting from replayed or cloned biometric data. Thus, using QSVM and VQC software enables enhanced anomaly detection compared against contemporary techniques using non-quantum hardware and software.

In quantum mechanics, all states of a quantum system can be represented as vectors in a Hilbert space. Hilbert spaces are complex, high-dimensional vector spaces. Unlike non-quantum feature spaces, where each dimension corresponds to a single variable, a quantum state can exist as a superposition of basis states. Authentication data can be encoded into qubits using quantum computing. Each additional qubit effectively doubles the size of the state space, allowing for exponentially greater representational capacity compared to that available using non-quantum feature spaces. As a result, QSVMs and VQCs can reveal subtle correlations and anomalies by analyzing the enlarged state space. As a result, in the context of, for example, authentication transactions, genuine biometric data can be more effectively separated from fraudulent or morphed biometric data to thus enhance the detection of anomalies that contemporary techniques using non-quantum hardware and software would likely miss.

In step 39, the software 40 executed by the processor 18 causes the electronic device 12 to calculate, based on the detected anomalies, a confidence score reflecting the likelihood that the received data is genuine. When the biometric modality is for a plurality of biometric modalities, the single multi-modal qubit or quantum state is used to compute a unified anomaly score that captures cross modal inconsistencies to further enhance spoof resistance and leveraging the high-dimensional power of quantum feature spaces.

Next, in step S40, the software 40 executed by the processor 18 causes the electronic device 12 to compare the confidence score against a confidence threshold value. If the confidence score satisfies the confidence threshold value, in step S41, the software 40 executed by the processor 18 causes the electronic device 12 to determine that the received biometric modality data is genuine. However, when the confidence score fails to satisfy the confidence threshold value, in step S42, the software 40 executed by the processor 18 causes the electronic device 12 to determine that the received biometric modality data may not be genuine and as a result that secondary authentication is required. Secondary authentication includes, but is not limited to, manual review or other contemporary biometric authentication methods. Not satisfying the confidence threshold value may indicate that the received biometric modality data is fraudulent because it did not include the noise vector generated for the authentication transaction.

Using the example methods and algorithms for enhancing security against quantum side channel replay attacks described herein facilitates enhancing the security of quantum enhanced computer systems against attacks perpetuated by adversaries capable of intercepting, cloning or replaying quantum state vectors. Moreover, the example methods and algorithms for enhancing security against quantum side channel replay attacks described herein facilitate supporting integration with privacy-preserving biometric protocols, including secure aggregation and post-quantum cryptographic transport. Additionally, the example methods and algorithms for enhancing security against quantum side channel replay attacks offer a defense mechanism that is adaptive, privacy-preserving, and computationally efficient, making it suitable for deployment on mobile edge devices, national identification systems, and other latency-sensitive biometric platforms. By disrupting the static nature of quantum-encoded identity states without compromising genuine classification, quantum-resilient authentication systems are facilitated to be enhanced.

Although the noise values are generated using a cryptographically secure pseudorandom function seeded with an ephemeral key in the example method and algorithm for enhancing security against quantum side channel replay attacks described herein, it is contemplated by the present disclosure that the noise may alternatively, or additionally, be generated by, for example, a differential-privacy mechanism drawing from a LaPlacian or Gaussian distribution calibrated to an $\in$-DP budget, where DP abbreviates Differential Privacy. Selected amplitude components are modified by the DP-noise and the QSVC and VQC are trained using the DP-noise states which provides formal privacy guarantees and limits potential information leakage about the underlying biometric features in compliance with the General Data Protection Regulation (GDPR) as enacted by the European Union, the California Privacy Act (CPA), the Illinois Biometric Information Privacy Act (B.I.P.A.), and similar regulations.

It should be understood that & is considered to be a privacy budget. That is, a parameter controlling the tradeoff between privacy and accuracy. A lower & generally means that there is stronger privacy and more noise.

It is contemplated by the present disclosure that alternative embodiments of the example method and algorithm for enhancing security against quantum side-channel replay attacks described herein may incorporate an active challenge-response feature. For example, the electronic device 12 may issue a random quantum circuit challenge that is integrated into the normalized feature vector while modifying the amplitude components of the normalized feature vector. An example challenge-response may be a vector of basis rotations. A confidence score may not be calculated unless the normalized modified feature vector includes the challenge-response. Any replay or reuse of a quantum state lacking the challenge-response will indicate that the received biometric modality data is likely fraudulent. Thus, enhancing security.

The confidence threshold value described herein may be satisfied when the confidence score is greater than or equal to the confidence threshold value. Other confidence threshold values may be satisfied when the calculated confidence score is less than or equal to the confidence threshold value. Alternatively, the confidence threshold value may include multiple threshold values, each of which is required to be satisfied to satisfy the confidence threshold value.

It is contemplated by the present disclosure that the example methods and algorithms described herein may be conducted entirely by the electronic device 12; partly by the electronic device 12 and partly by the quantum computer 14; entirely by the quantum computer 14, or by any other combination of other servers (not shown), electronic devices (not shown), or computers (not shown) operable to communicate with the electronic device 12 and the quantum computer 14 via the network 16. Furthermore, data described herein as being stored in the electronic device 12 may alternatively, or additionally, be stored in any other server (not shown), electronic device (not shown), or computer (not shown) operable to communicate with the electronic device 12 via the network 16.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for enhancing security against quantum side-channel replay attacks during biometric authentication transactions comprising the steps of:

receiving, by an electronic device, data for a biometric modality of a person during an authentication transaction;

computing a feature vector from the received biometric modality data and normalizing the feature vector, the feature vector includes amplitude components;

generating a noise vector for the authentication transaction, wherein the noise vector is different for each different authentication transaction;

selecting amplitude components of the normalized feature vector to be modified;

modifying the selected amplitude components using the noise vector;

normalizing the modified feature vector;

encoding the normalized modified feature vector into qubits;

expanding, using at least one quantum algorithm, the qubits into a high-dimensional space;

detecting in the high-dimensional space anomalies indicative of fraud based on the qubits;

calculating, based on the detected anomalies, an anomaly score reflecting a likelihood that the received data is genuine;

comparing the anomaly score against a threshold value; and in response to determining the anomaly score fails to satisfy the threshold value, determining the received biometric modality data requires secondary authentication.

2. The method according to claim 1, said encoding step comprises encoding the normalized modified feature vector using at least one of amplitude encoding and angle encoding.

3. The method according to claim 1, said selecting step comprising computing a Fisher information-based saliency metric and choosing amplitude components with the highest discriminative importance.

4. The method according to claim 1, said generating step comprising seeding a cryptographic pseudorandom function with a hardware-derived or a network provided nonce.

5. The method according to claim 1, further comprising:

determining a cryptographic state identifier calculated for each of a plurality of authentication transactions;

comparing the cryptographic state identifiers against each other; and in response to detecting a match between any pair of cryptographic state identifiers implementing measures to minimize impacts to sensitive information.

6. The method according to claim 1, wherein noise-induced inaccuracies are imparted to the high-dimensional space by Noisy Intermediate-Scale Quantum hardware included in the electronic device during said expanding and detecting steps, said method further comprising reducing the noise-induced inaccuracies using at least one error mitigation technique, wherein the at least one error mitigation technique comprises zero-noise extrapolation, readout error mitigation, and randomized compiling.

7. The method according to claim 1, further comprising dynamically adjusting an error-mitigation parameter based on real-time metrics to maintain a target error-security trade-off.

8. The method according to claim 1, said encoding step comprising mapping at least sixty-four amplitude components into a corresponding qubit register.

9. An electronic device for enhancing security against quantum side-channel replay attacks during biometric authentication transactions comprising:

a processor; and a memory configured to store data, said electronic device being associated with a network and said memory being in communication with said processor and having instructions stored thereon which, when read and executed by said processor, cause said electronic device to:

receive data for a biometric modality of a person during an authentication transaction;

compute a feature vector from the received biometric modality data and normalize the feature vector, the feature vector includes amplitude components;

generate a noise vector for the authentication transaction, wherein the noise vector is different for each different authentication transaction;

select amplitude components of the normalized feature vector to be modified;

modify the selected amplitude components using the noise vector;

normalize the modified feature vector;

encode the normalized modified feature vector into qubits;

expand, using at least one quantum algorithm operated by the electronic device, the qubits into a high-dimensional space;

detect in the high-dimensional space anomalies indicative of fraud based on the qubits;

calculate, based on the detected anomalies, an anomaly score reflecting a likelihood that the received data is genuine;

compare the anomaly score against a threshold value; and in response to determining the anomaly score fails to satisfy the threshold value, determine the received biometric modality data requires secondary authentication.

10. The electronic device according to claim 9, wherein the instructions when read and executed by said processor, cause said electronic device to encode the normalized modified feature vector using at least one of amplitude encoding and angle encoding.

11. The electronic device according to claim 9, wherein the instructions when read and executed by said processor, cause said electronic device to compute a Fisher information-based saliency metric and choosing amplitude components with the highest discriminative importance.

12. The electronic device according to claim 9, wherein the instructions when read and executed by said processor, cause said electronic device to expand the feature vectors by mapping features from the normalized modified feature vector into a high-dimensional Hilbert space.

13. The electronic device according to claim 9, wherein the instructions when read and executed by said processor, cause said electronic device to seed a cryptographic pseudorandom function with a hardware-derived or a network provided nonce.

14. The electronic device according to claim 9, wherein noise-induced inaccuracies are imparted to the high-dimensional space by Noisy Intermediate-Scale Quantum hardware included in said electronic device while expanding the normalized feature vector and detecting anomalies, and the instructions when read and executed by said processor, cause said electronic device to reduce the noise-induced inaccuracies using at least one error mitigation technique, wherein the at least one error mitigation technique comprises zero-noise extrapolation, readout error mitigation, and randomized compiling.

15. The electronic device according to claim 9, wherein the instructions when read and executed by said processor, cause said electronic device to:

determine a cryptographic state identifier calculated for each of a plurality of authentication transactions;

compare the cryptographic state identifiers against each other; and in response to detecting a match between any pair of cryptographic state identifiers implement measures to minimize impacts to sensitive information.

16. The electronic device according to claim 9, wherein the instructions when read and executed by said processor, cause said electronic device to map at least 64 amplitude components into a corresponding qubit register.

17. A non-transitory computer-readable recording medium in an electronic device for enhancing security against quantum side-channel replay attacks during biometric authentication transactions, the non-transitory computer-readable recording medium storing instructions which when executed by a hardware processor cause the non-transitory recording medium to perform steps comprising:

receiving data for a biometric modality of a person during an authentication transaction;

computing a feature vector from the received biometric modality data and normalizing the feature vector, the feature vector includes amplitude components;

generating a noise vector for the authentication transaction, wherein the noise vector is different for each different authentication transaction;

selecting amplitude components of the normalized feature vector to be modified;

modifying the selected amplitude components using the noise vector;

normalizing the modified feature vector;

encoding the normalized modified feature vector into qubits;

expanding, using at least one quantum algorithm, the qubits into a high-dimensional space;

detecting in the high-dimensional space anomalies indicative of fraud based on the qubits;

calculating, based on the detected anomalies, an anomaly score reflecting a likelihood that the received data is genuine;

comparing the anomaly score against a threshold value; and in response to determining the anomaly score fails to satisfy the threshold value, determining the received biometric modality data requires secondary authentication.

18. The non-transitory computer-readable recording medium according to claim 17, wherein the instructions when read and executed by said processor, cause said non-transitory computer-readable recording medium to perform said encoding step by encoding the normalized modified feature vector using at least one of amplitude encoding and angle encoding.

19. The non-transitory computer-readable recording medium according to claim 17, wherein the instructions when read and executed by said processor, cause said non-transitory computer-readable recording medium to perform said selecting step by computing a Fisher information-based saliency metric and choosing amplitude components with the highest discriminative importance.

20. The non-transitory computer-readable recording medium according to claim 17, wherein the instructions when read and executed by said processor, cause said non-transitory computer-readable recording medium to perform steps comprising:

determining a cryptographic state identifier calculated for each of a plurality of authentication transactions;

comparing the cryptographic state identifiers against each other; and in response to detecting a match between any pair of cryptographic state identifiers, implementing measures to minimize impacts to sensitive information.

* * * * *